United States Patent
Coban et al.

(10) Patent No.: US 11,477,464 B2
(45) Date of Patent: Oct. 18, 2022

(54) END-TO-END NEURAL NETWORK BASED VIDEO CODING

(71) Applicant: QUALCOMM Incorporated, San Diego, CA (US)

(72) Inventors: Muhammed Zeyd Coban, Carlsbad, CA (US); Ankitesh Kumar Singh, San Diego, CA (US); Hilmi Enes Egilmez, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/182,686

(22) Filed: Feb. 23, 2021

(65) Prior Publication Data

US 2022/0086463 A1 Mar. 17, 2022

Related U.S. Application Data

(60) Provisional application No. 63/079,402, filed on Sep. 16, 2020.

(51) Int. Cl.
*H04N 19/186* (2014.01)
*G06N 3/04* (2006.01)
(Continued)

(52) U.S. Cl.
CPC ............ *H04N 19/186* (2014.11); *G06N 3/04* (2013.01); *H04N 19/172* (2014.11); *H04N 19/90* (2014.11)

(58) Field of Classification Search
CPC .... H04N 19/186; H04N 19/172; H04N 19/90; G06N 3/04
(Continued)

(56) References Cited

U.S. PATENT DOCUMENTS

2015/0278628 A1* 10/2015 Agrawal ............... G06N 3/049
 382/156
2019/0220746 A1 7/2019 Liu et al.
(Continued)

OTHER PUBLICATIONS

Blanch, M.G., et al., "Chroma Intra Prediction with Attention-Based CNN Architectures", 2020 IEEE International Conference on Image Processing (ICIP), IEEE, Sep. 9, 2020 (Sep. 9, 2020), XP033869761, pp. 783-787, DOI:10.1109/ICIP40778.2020.9191050 [retrieved on Sep. 9, 2020] Paragraph [0003], Figure 1.
(Continued)

*Primary Examiner* — Allen C Wong
(74) *Attorney, Agent, or Firm* — Polsinelli LLP

(57) ABSTRACT

Systems and techniques are described herein for processing video data using a neural network system. For instance, a process can include generating, by a first convolutional layer of an encoder sub-network of the neural network system, output values associated with a luminance channel of a frame. The process can include generating, by a second convolutional layer of the encoder sub-network, output values associated with at least one chrominance channel of the frame. The process can include generating a combined representation of the frame by combining the output values associated with the luminance channel of the frame and the output values associated with the at least one chrominance channel of the frame. The process can include generating encoded video data based on the combined representation of the frame.

30 Claims, 11 Drawing Sheets

(51) Int. Cl.
*H04N 19/90* (2014.01)
*H04N 19/172* (2014.01)

(58) Field of Classification Search
USPC .................................................... 375/240.12
See application file for complete search history.

(56) References Cited

U.S. PATENT DOCUMENTS

2021/0120270 A1* 4/2021 Massimino .......... H04N 19/129
2021/0150767 A1* 5/2021 Ikai ..................... G06T 9/002

OTHER PUBLICATIONS

Egilmez, H.E., et al., "Transform Network Architectures for Deep Learning based End-to-End Image/Video Coding in Subsampled Color Spaces", Arxiv.Org, Cornell University Library, 201 Olin Library Cornell University Ithaca, NY 14853, Feb. 27, 2021 (Feb. 27, 2021), XP081894019, pp. 1-10, the whole document.

Egilmez, H.E., et al., "Transform Network Architectures for Deep Learning Based End-to-End Image/Video Coding in Subsampled Color Spaces", IEEE Open Journal of Signal Processing, IEEE, vol. 2, Jun. 24, 2021 (Jun. 24, 2021), XP011880429, pp. 441-452, DOI: 10.1109/OJSP.2021.3092257 [retrieved on Sep. 27, 2021] the whole document.

International Search Report and Written Opinion—PCT/US2021/046176—ISA/EPO—Nov. 18, 2021.

Liu, H., et al., "[DNNVC] End-to-End Neural Video Coding—From Pixel Prediction to Feature Sensing", 131, MPEG Meeting, Jun. 29, 2020-Jul. 3, 2020, Online, (Motion Picture Expert Group or ISO/IEC JTC1/SC29/WG11), No. m54341 Jun. 24, 2020 (Jun. 24, 2020), XP030288662, pp. 1-17, Retrieved from the Internet: URL: http://phenix.int-evry.fr/mpeg/doc_end_user/documents/131_OnLine/wg11/m54341-v1-m54341_NeuralVideoCoding.zip NeuralVideoCoding-draft-paper.pdf [retrieved on Jun. 24, 2020] Figure 2.

Singh, A.K., et al. "A Combined Deep Learning Based End-to-End Video Coding Architecture for YUV Color Space", Arxiv.Org, Cornell University Library, 201 Olin Library Cornell University Ithaca, NY 14853, Apr. 1, 2021 (Apr. 1, 2021), XP081931322, 5 Pages, the whole document.

Singh, (QUALCOMM) A.K., et al., "[DNNVC] A Study of Handling YUV420 Input Format for DNN-Based Video Coding", 20, JVET Meeting, Jan. 7, 2020-Oct. 16, 2020, Teleconference, (The Joint Video Exploration Team of ISO/IEC JTC1/SC29/WG11 and ITU-TSG.16), No. JVET-T0123 Oct. 14, 2020 (Oct. 14, 2020), XP030289972, pp. 1-8, Retrieved from the Internet: URL: http://phenix.int-evry.fr/jvet/doc_end_user/documents/20_Teleconference/wg11/JVET-T0123-v3.zip JVET-T0123.docx [retrieved on Oct. 14, 2020] the whole document.

* cited by examiner

END-TO-END NEURAL NETWORK BASED VIDEO CODING

CROSS-REFERENCE TO RELATED APPLICATIONS

This application claims the benefit of U.S. Provisional Application No. 63/079,402 filed Sep. 16, 2020, which is hereby incorporated by reference for all purposes.

FIELD OF THE DISCLOSURE

The present disclosure generally relates to image and video coding, including encoding (or compression) and decoding (decompression) of images and/or video. For example, aspects of the present disclosure relate to techniques for handling luminance-chrominance (YUV) input formats (e.g., YUV420, YUV444, YUV422, etc.) and/or other input formats using an end-to-end machine learning (e.g., neural network)-based image and video coding system.

BACKGROUND

Many devices and systems allow video data to be processed and output for consumption. Digital video data includes large amounts of data to meet the demands of consumers and video providers. For example, consumers of video data desire high quality video, including high fidelity, resolutions, frame rates, and the like. As a result, the large amount of video data that is required to meet these demands places a burden on communication networks and devices that process and store the video data.

Video coding techniques may be used to compress video data. A goal of video coding is to compress video data into a form that uses a lower bit rate, while avoiding or minimizing degradations to video quality. With ever-evolving video services becoming available, encoding techniques with better coding efficiency are needed.

SUMMARY

Systems and techniques are described for coding (e.g., encoding and/or decoding) image and/or video content using one or more machine learning systems. For example, an end-to-end machine learning (e.g., neural network)-based image and video coding (E2E-NNVC) system is provided that can process YUV (digital domain YCbCr) input formats (and in some cases other input formats). The E2E-NNVC system can process stand-alone frames (also referred to as images) and/or video data that includes multiple frames. The YUV format includes a luminance channel (Y) and a pair of chrominance channels (U and V). The U and V channels can be subsampled with respect to the Y channel without a significant or noticeable impact on visual quality. The correlation across channels is reduced in the YUV format, which may not be the case with other color formats (e.g., the red-green-blue (RGB) format).

Some examples described herein improve the operations of devices by enabling E2E-NNVC operations for video formats with channels having different characteristics. For example, some YUV formats (e.g., a YUV 420 format) includes a luminance channel (Y channel) with a resolution that is larger (e.g., twice the number of pixels in both a horizontal and vertical dimension) than the resolution of the chrominance channels (U and V channels). Standard E2E-NNVC systems cannot efficiently process such video formats. Examples described herein structure an initial encoding layer and a final decoding layer that equalize the characteristics of the different channel to allow the different channels to be processed together by the other layers of the E2E-NNVC system. The initial encoding layer and final decoding layer can include convolution layers for an existing RGB system, with a second parallel layer for processing a channel with different characteristics (e.g., a modified RGB processing system). Other examples can be specifically designed for YUV format processing. For instance, using the YUV 420 format as an illustrative example, luminance channels are downsampled by an initial layer while chrominance channels are not downsampled. After normalization (e.g., performing operations to balance data) at the initial layer, the luminance and chrominance data are at a shared resolution, and can be processed together by the remaining encoding and decoding steps up until the final decoding layer, where the chrominance and luminance data are separated and treated differently to return to the YUV 420 format. Similar to the initial encoding layer, in the final decoding layer, the luminance data can be upsampled while the chrominance data is processed in the final layer with no upsampling. Other examples include other such structures that use initial encoding layers and final decoding layers to perform such operations to standardize the channel data. Such layers further improve the operation and efficiency of devices by allowing standardized central NNVC layers (e.g., layers used with video formats having channels with similar characteristics, such as RGB format data) to be used in processing data with channels having differing characteristics.

Some examples can further improve the operations of a device with efficient processing of an initial layer of data. For example, rather than using the same filter on a higher resolution channel and a lower resolution channel, customized filters can be selected for each channel. The processing resources used are reduced where a smaller filter is used for a lower resolution channel (e.g., compared with using the larger filter for both higher and lower resolution channels), and video quality is improved where a larger filter is used for the larger resolution channel (e.g., compared with using the smaller filter for both high and lower resolution channels). Further still, targeted normalization (e.g., balance operations, scale operations, or other operations) for the different channels at the initial encoding layer and final decoding layer allows channels with different statistical characteristics (e.g., different mean, variance, or other such statistical characteristics that can impact video processing results) to be managed independently and standardized to be processed by the remaining layers, resulting in improved overall video quality for a given amount of video compression. Since video formats with channels having different characteristics (e.g., resolution or statistical characteristics) provide improved compression in many video communication systems, examples described above improve the operation of E2E-NNVC systems by further enabling improved communication efficiency when compared with existing E2E-NNVC (e.g., RGB format) systems.

In one illustrative example, a method of encoding video data is provided. The method includes: generating, by a first convolutional layer of an encoder sub-network of a neural network system, output values associated with a luminance channel of a frame; generating, by a second convolutional layer of the encoder sub-network, output values associated with at least one chrominance channel of the frame; generating a combined representation of the frame by combining the output values associated with the luminance channel of the frame and the output values associated with the at least one chrominance channel of the frame; and generating encoded video data based on the combined representation of the frame.

In another example, an apparatus for encoding video data is provided that includes a memory and a processor (e.g., implemented in circuitry) coupled to the memory. In some examples, more than one processor can be coupled to the memory and can be used to perform one or more of the operations. The processor is configured to: generate, using a first convolutional layer of an encoder sub-network of a neural network system, output values associated with a luminance channel of a frame; generate, using a second convolutional layer of the encoder sub-network, output values associated with at least one chrominance channel of the frame; generate a combined representation of the frame by combining the output values associated with the luminance channel of the frame and the output values associated with the at least one chrominance channel of the frame; and generate encoded video data based on the combined representation of the frame.

In another example, a non-transitory computer-readable medium is provided for encoding video data, which has stored thereon instructions that, when executed by one or more processors, cause the one or more processor to: generate, using a first convolutional layer of an encoder sub-network of a neural network system, output values associated with a luminance channel of a frame; generate, using a second convolutional layer of the encoder sub-network, output values associated with at least one chrominance channel of the frame; generate a combined representation of the frame by combining the output values associated with the luminance channel of the frame and the output values associated with the at least one chrominance channel of the frame; and generate encoded video data based on the combined representation of the frame.

In another example, an apparatus for encoding video data is provided. The apparatus includes: means for generating output values associated with a luminance channel of a frame; means for generating output values associated with at least one chrominance channel of the frame; means for generating a combined representation of the frame by combining the output values associated with the luminance channel of the frame and the output values associated with the at least one chrominance channel of the frame; and means for generating encoded video data based on the combined representation of the frame.

In some aspects, the methods, apparatuses, and computer-readable medium described above for encoding video data further comprise: processing, using a first normalization layer of the encoder sub-network, the output values associated with a luminance channel of the frame; and processing, using a second normalization layer of the encoder sub-network, the output values associated with at least one chrominance channel of the frame. In such aspects, the combined representation is generated based on an output of the first normalization layer and an output of the second normalization layer.

In some aspects, the at least one chrominance channel and the luminance channel have different statistical characteristics. In some aspects, the first normalization layer and the second normalization layer are configured to balance statistical characteristics of the output values associated with the at least one chrominance channel and the output values associated with the luminance channel.

In some aspects, the first convolutional layer of the encoder sub-network subsamples the luminance channel of the frame. In some cases, a luminance filter of the first convolutional layer has a luminance filter size larger than a chrominance filter size of a chrominance filter of the second convolutional layer.

In some aspects, the methods, apparatuses, and computer-readable medium described above for encoding video data further comprise: accessing input luminance values associated with the luminance channel of the frame, wherein the input luminance values are further associated with a luminance resolution; and accessing input chrominance values associated with the at least one chrominance channel of the frame, wherein the input chrominance values are further associated with a chrominance resolution, and wherein the luminance resolution is larger than the chrominance resolution.

In some aspects, a luminance filter of the first convolutional layer has a luminance filter size five pixels by five pixels, and wherein a chrominance filter of the second convolutional layer has a chrominance filter size of three pixels by three pixels.

In another illustrative example, a method of decoding video data is provided. The method includes: obtaining an encoded frame; generating, by a first convolutional layer of a decoder sub-network of a neural network system, reconstructed output values associated with a luminance channel of the encoded frame; generating, by a second convolutional layer of the decoder sub-network, reconstructed output values associated with at least one chrominance channel of the encoded frame; and generating an output frame including the reconstructed output values associated with the luminance channel and the reconstructed output values associated with the at least one chrominance channel.

In another example, an apparatus for decoding video data is provided that includes a memory and a processor (e.g., implemented in circuitry) coupled to the memory. In some examples, more than one processor can be coupled to the memory and can be used to perform one or more of the operations. The processor is configured to: obtain an encoded frame; generate, using a first convolutional layer of a decoder sub-network of a neural network system, reconstructed output values associated with a luminance channel of the encoded frame; generate, using a second convolutional layer of the decoder sub-network, reconstructed output values associated with at least one chrominance channel of the encoded frame; and generate an output frame including the reconstructed output values associated with the luminance channel and the reconstructed output values associated with the at least one chrominance channel.

In another example, a non-transitory computer-readable medium is provided for decoding video data, which has stored thereon instructions that, when executed by one or more processors, cause the one or more processor to: obtain an encoded frame; generate, using a first convolutional layer of a decoder sub-network of a neural network system, reconstructed output values associated with a luminance channel of the encoded frame; generate, using a second convolutional layer of the decoder sub-network, reconstructed output values associated with at least one chrominance channel of the encoded frame; and generate an output frame including the reconstructed output values associated with the luminance channel and the reconstructed output values associated with the at least one chrominance channel.

In another example, an apparatus for decoding video data is provided. The apparatus includes: means for obtaining an encoded frame; means for generating reconstructed output values associated with a luminance channel of the encoded frame; means for generating reconstructed output values associated with at least one chrominance channel of the encoded frame; and means for generating an output frame including the reconstructed output values associated with the luminance channel and the reconstructed output values associated with the at least one chrominance channel.

In some aspects, the method, apparatuses, and computer-readable medium described above for decoding video data further comprise: processing, using a first normalization layer of the decoder sub-network, values associated with the luminance channel of the encoded frame, wherein the reconstructed output values associated with the luminance channel are generated based on an output of the first normalization layer; and processing, using a second normalization layer of the decoder sub-network, values associated with the at least one chrominance channel of the encoded frame, wherein the reconstructed output values associated with the at least one chrominance channel are generated based on an output of the second normalization layer.

In some aspects, the method, apparatuses, and computer-readable medium described above for decoding video data further comprise: processing, using a first normalization layer of the decoder sub-network, values associated with the luminance channel of the encoded frame, wherein the reconstructed output values associated with the luminance channel are generated based on an output of the first normalization layer; and processing, using a second normalization layer of the decoder sub-network, values associated with the at least one chrominance channel of the encoded frame, wherein the reconstructed output values associated with the at least one chrominance channel are generated based on an output of the second normalization layer.

In some aspects, the first convolutional layer of the decoder sub-network upsamples the luminance channel of the encoded frame.

In some aspects, a luminance filter of the first convolutional layer has a luminance filter size larger than a chrominance filter size of a chrominance filter of the second convolutional layer.

In some aspects, the luminance filter size is nine pixels by nine pixels, and the chrominance filter size is five pixels by five pixels.

In some aspects, the method, apparatuses, and computer-readable medium described above for decoding video data further comprise entropy decoding samples of the encoded frame.

In some aspects, the method, apparatuses, and computer-readable medium described above for decoding video data further comprise: generating, using a first convolutional layer of an encoder sub-network of the neural network system, output values associated with the luminance channel of a frame; generating, using a second convolutional layer of the encoder sub-network, output values associated with the at least one chrominance channel of the frame; generating a combined representation of the frame by combining the output values associated with the luminance channel of the frame and the output values associated with the at least one chrominance channel of the frame; and generating the encoded frame based on the combined representation of the frame.

In some aspects, the apparatus comprises a mobile device (e.g., a mobile telephone or so-called "smart phone", a tablet computer, or other type of mobile device), a wearable device, an extended reality device (e.g., a virtual reality (VR) device, an augmented reality (AR) device, or a mixed reality (MR) device), a personal computer, a laptop computer, a video server, a television, a vehicle (or a computing device of a vehicle), or other device. In some aspects, the apparatus includes at least one camera for capturing one or more images or video frames. For example, the apparatus can include a camera (e.g., an RGB camera) or multiple cameras for capturing one or more images and/or one or more videos including video frames. In some aspects, the apparatus includes a display for displaying one or more images, videos, notifications, or other displayable data. In some aspects, the apparatus includes a transmitter configured to transmit one or more video frame and/or syntax data over a transmission medium to at least one device. In some aspects, the processor includes a neural processing unit (NPU), a central processing unit (CPU), a graphics processing unit (GPU), or other processing device or component.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Figure 1:
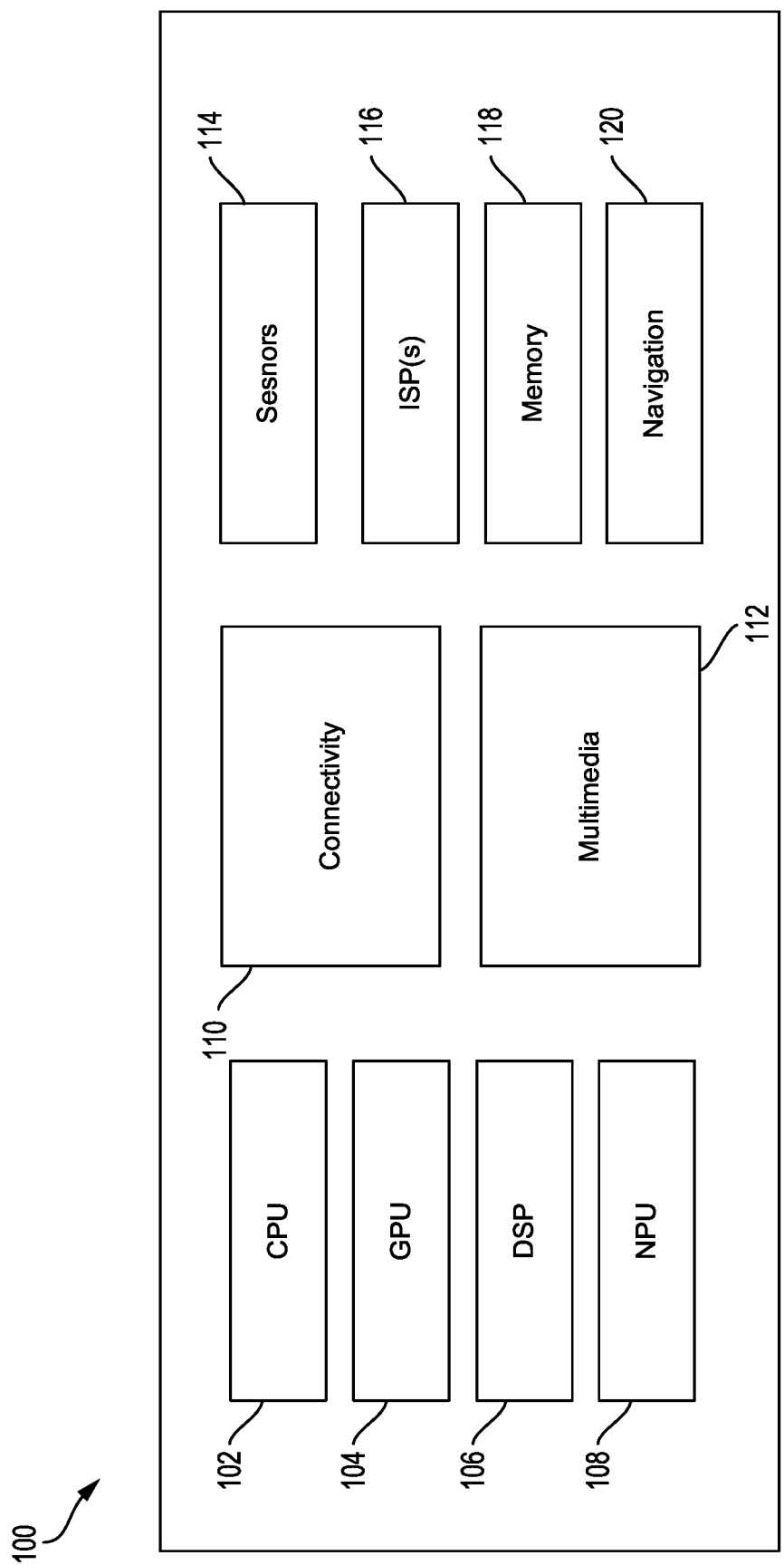
FIG. 1 illustrates an example implementation of a system-on-a-chip (SOC) that can be used to implement neural network video coding layers in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the application as set forth in the appended claims.

Aspects of the present disclosure generally relate to image and video coding, including encoding (or compression) and decoding (decompression) of images and/or video. Some aspects of the present disclosure relate to techniques for handling luminance-chrominance (YUV) input formats (e.g., YUV420, YUV444, YUV422, etc.) and/or other input formats with channels having differing characteristics using an end-to-end machine learning-based image and video coding system (e.g., end-to-end neural network video coding (E2E-NNVC) system).

As described above, digital video involves large amounts of data, and network transmission of video data is increasing, resulting in a demand for effective compression and efficient use of network resources. Increases in computing power have driven the use of machine-learning structures, such as neural networks, which can leverage improvements in processing devices to identify unexpected relationships in data and improve data analysis in a wide variety of applications. The large amount of data in video communication systems combined with the processor intensive nature of neural networks makes efficient use of resources particularly important for machine-learning structures in video coding systems. At the same time, an important aspect of video coding systems is image quality, and image quality can be compromised by excessive compression.

YUV video formats use a family of color spaces which encode brightness information in a separate channel from color information. Red-Green-Blue (RGB) video formats, by contrast, encode brightness and color information for different colors in different channels, (e.g., red, green, and blue channels). While YUV formats are not inherently more compact than RGB formats, because human eyes are less sensitive to changes in color hue than changes in brightness, YUV video formats can use additional compression on color channels (e.g., chrominance channels) compared with brightness channels (e.g., luminance channels). The difference can allow more compression and efficient network resource usage for YUV format video compared with RGB format video, but may result in coding systems handling channels with different characteristics (e.g., number of pixels per frame, statistical characteristics such as mean and variance of pixel data, etc.)

Neural network structures are highly customized to input data, and so the characteristics of different channels (e.g., Y and UV channels in YUV format data) use different neural network processing structures to handle the data. Although YUV formats have benefits associated with compression levels and associated perceived image quality, using two separate neural network processing paths is inefficient. Examples described herein include initial neural network coding layers that process the channels with different characteristics separately, and standardize the data characteristics so that subsequent processing layers in an E2E-NNVC system can be shared by the different channels. Similarly, decoding according to examples described herein uses shared layers to process the different channels. Separate processing paths in a final output layer can obtain the standardized encoded data and can process the channels with different characteristics separately in the final layer to generate the output data.

Some examples described herein balance the additional resources needed by the YUV channels having different characteristics with the benefits of YUV coding to improve the performance of E2E-NNVC systems. By natively handling YUV formats, processing resources that would be used by RGB-to-YUV conversion are eliminated for YUV video coding. Additionally, shared middle or intermediate layers (e.g., layers between an initial encoding layer and a final decoding layer) are used for channels having different native characteristics by using the initial and final layers to manage the channel differences, allowing efficient processing resource usage for the middle layers. The above described aspects improve the operation of video coding devices and systems.

Additionally, in some aspects, the initial encoding layer and final decoding layer can be structured to efficiently filter the different channels. For example, a luminance (Y) layer at higher resolution can use a separate filter structure with a larger filter (e.g., a 5×5 filter), while chrominance (U and V) layers at a lower resolution can use smaller filters (e.g., a 3×3 filter). By using filters targeted to the characteristics of the particular channels in the initial encoding layer and final decoding layer, the resources used to achieve a desired image quality can be allocated based on the characteristics of each channel. By contrast, using a single filter in the initial and final layers would result either in excess resources devoted to lower resolution data or lower image quality where a smaller filter is used for higher resolution data. Some examples described herein improve the operation of coding devices with efficient balancing of resource usage and video image quality with video filters in initial encoding layers and final decoding layers designed at the channel level. The result is either improved image quality (e.g., compared with a smaller filter applied to channels of different resolutions), reduced processing resource usage (e.g., compared with a larger filter applied to channels of different resolutions), or both (e.g., due to a smaller filter used for a lower resolution channel and benefits of different normalization for channels with different statistical characteristics).

As described above, video data, and particularly digital video data, can include large amounts of data, particularly as the demand for high quality video data continues to grow. For example, consumers of video data typically desire video of increasingly high quality, with high fidelity, resolution, frame rates, and the like. However, the large amount of video data required to meet such demands can place a significant burden on communication networks as well as on devices that process and store the video data.

Various techniques can be used to code video data. Video coding can be performed according to a particular video coding standard. Example video coding standards include high-efficiency video coding (HEVC), advanced video coding (AVC), moving picture experts group (MPEG) coding, and versatile video coding (VVC). Video coding often uses prediction methods such as inter-prediction or intra-prediction, which take advantage of redundancies present in video images or sequences. A common goal of video coding techniques is to compress video data into a form that uses a lower bit rate, while avoiding or minimizing degradations in the video quality. As the demand for video services grows and new video services become available, coding techniques with better coding efficiency, performance, and rate control are needed.

Systems, apparatuses, processes (also referred to as methods), and computer-readable media (collectively referred to as "systems and techniques") are described herein for performing image and/or video coding using one or more machine learning (ML) systems. In general, ML is a subset of artificial intelligence (AI). ML systems can include algorithms and statistical models that computer systems can use to perform various tasks by relying on patterns and inference, without the use of explicit instructions. One example of a ML system is a neural network (also referred to as an artificial neural network), which may include an interconnected group of artificial neurons (e.g., neuron models). Neural networks may be used for various applications and/or devices, such as image and/or video coding, image analysis and/or computer vision applications, Internet Protocol (IP) cameras, Internet of Things (IoT) devices, autonomous vehicles, service robots, among others.

Individual nodes in the neural network may emulate biological neurons by taking input data and performing simple operations on the data. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation" (sometimes referred to as an activation map or feature map). The weight values may initially be determined by an iterative flow of training data through the network (e.g., weight values are established during a training phase in which the network learns how to identify particular classes by their typical input data characteristics).

Different types of neural networks exist, such as convolutional neural networks (CNNs), recurrent neural networks (RNNs), generative adversarial networks (GANs), multi-layer perceptron (MLP) neural networks, among others. For instance, convolutional neural networks (CNNs) are a type of feed-forward artificial neural network. Convolutional neural networks may include collections of artificial neurons that each have a receptive field (e.g., a spatially localized region of an input space) and that collectively tile an input space. RNNs work on the principle of saving the output of a layer and feeding the output back to the input to help in predicting an outcome of the layer. A GAN is a form of generative neural network that can learn patterns in input data so that the neural network model can generate new synthetic outputs that reasonably could have been from the original dataset. A GAN can include two neural networks that operate together, including a generative neural network that generates a synthesized output and a discriminative neural network that evaluates the output for authenticity. In MLP neural networks, data may be fed into an input layer, and one or more hidden layers provide levels of abstraction to the data. Predictions may then be made on an output layer based on the abstracted data.

In layered neural network architectures (referred to as deep neural networks when multiple hidden layers are present), the output of a first layer of artificial neurons becomes an input to a second layer of artificial neurons, the output of a second layer of artificial neurons becomes an input to a third layer of artificial neurons, and so on. CNNs, for example, may be trained to recognize a hierarchy of features. Computation in CNN architectures may be distributed over a population of processing nodes, which may be configured in one or more computational chains. These multi-layered architectures may be trained one layer at a time and may be fine-tuned using back propagation.

In some aspects, the systems and techniques described herein include an end-to-end ML-based (e.g., using a neural network architecture) image and video coding (E2E-NNVC) system designed for processing input data that has luminance-chrominance (YUV) input formats. The YUV format includes a luminance channel (Y) and a pair of chrominance channels (U and V). The U channel can be referred to as the chrominance (or chroma)-blue channel and the U channel can be referred to as the chrominance (or chroma)-red channel. In some cases, the luminance (Y) channel or component can also be referred to as the luma channel or component. In some cases, the chrominance (U and V) channels or components can also be referred to as the chroma channels or components. YUV input formats can include YUV420, YUV444, YUV422, among others. In some cases, the techniques and systems described herein can be designed to handle other input formats, such as data having a Y-Chroma Blue (Cb)-Chroma Red (Cr) (YCbCr) format, a red-green-blue (RGB) format, and/or other format. The YUV format is for the analog domain and the YCbCr format. The E2E-NNVC system can encode and/or decode stand-alone frames (also referred to as images) and/or video data that includes multiple frames.

In many cases, E2E-NNVC systems are designed as combination of an auto encoder sub-network (the encoder sub-network) and a second sub-network responsible for learning a probabilistic model over quantized latents used for entropy coding (a decoder sub-network). In some cases, there can be other sub-networks of the decoder. Such an E2E-NNVC system architecture can be viewed as a combination of a transform plus quantization module (or encoder sub-network) and the entropy modelling sub-network module (or decoder sub-network). E2E-NNVC systems are typically designed to process RGB input. For example, the encoder and decoder sub-networks are typically designed for three-channel RGB input, where all input channels go through the same neural network layers (e.g., convolutional neural network (CNN) and/or generalized divisive normalization (GDN) layers). However, most image and image coding systems use YUV input formats (e.g., in many cases the YUV420 input format). The techniques and systems described herein provide an E2E-NNVC system that is designed for processing input data that has the YUV input formats.

Various aspects of the present disclosure will be described with respect to the figures. FIG. 1 illustrates an example implementation of a system-on-a-chip (SOC) 100, which may include a central processing unit (CPU) 102 or a multi-core CPU, configured to perform one or more of the functions described herein. Parameters or variables (e.g., neural signals and synaptic weights), system parameters associated with a computational device (e.g., neural network with weights), delays, frequency bin information, task information, among other information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, and/or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU 102, DSP 106, and/or GPU 104. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the CPU 102 may comprise code to search for a stored multiplication result in a lookup table (LUT) corresponding to a multiplication product of an input value and a filter weight. The instructions loaded into the CPU 102 may also comprise code to disable a multiplier during a multiplication operation of the multiplication product when a lookup table hit of the multiplication product is detected. In addition, the instructions loaded into the CPU 102 may comprise code to store a computed multiplication product of the input value and the filter weight when a lookup table miss of the multiplication product is detected.

SOC 100 and/or components thereof may be configured to perform video compression and/or decompression (also referred to as video encoding and/or decoding, collectively referred to as video coding) using machine learning techniques according to aspects of the present disclosure discussed herein. By using deep learning architectures to perform video compression and/or decompression, aspects of the present disclosure can increase the efficiency of video compression and/or decompression on a device. For example, a device using the video coding techniques described can compress video more efficiently using the machine learning based techniques, can transmit the compressed video to another device, and the other device can decompress the compressed video more efficiently using the machine learning based techniques described herein.

As noted above, a neural network is an example of a machine learning system, and can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low level characteristics of an input, and later layers building up a hierarchy of more complex and abstract characteristics.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
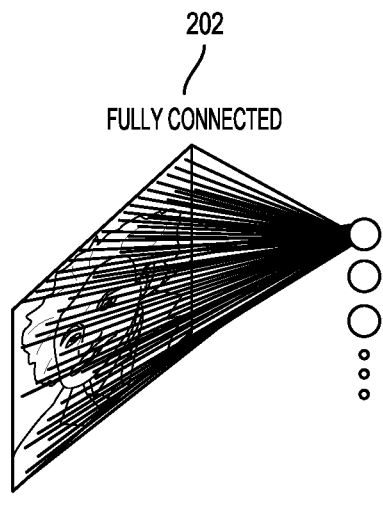
FIG. 2A illustrates aspects of neural networks in accordance with some examples described herein.
Figure 2B:
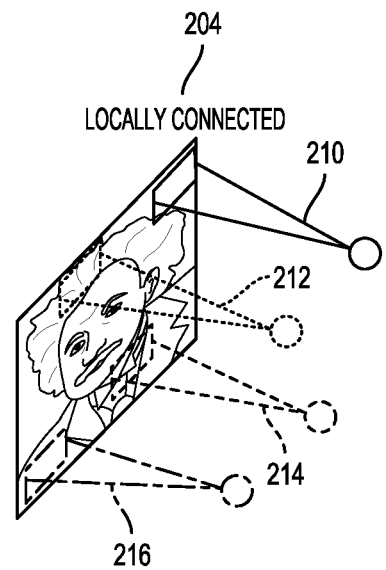
FIG. 2B illustrates aspects of neural networks in accordance with some examples described herein.

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
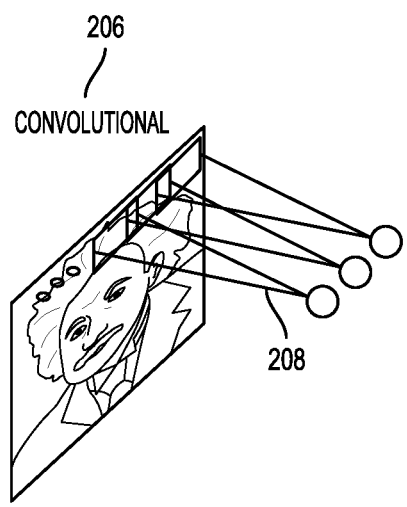
FIG. 2C illustrates aspects of neural networks in accordance with some examples described herein.

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful. Convolutional neural network 206 may be used to perform one or more aspects of video compression and/or decompression, according to aspects of the present disclosure.

Figure 2D:
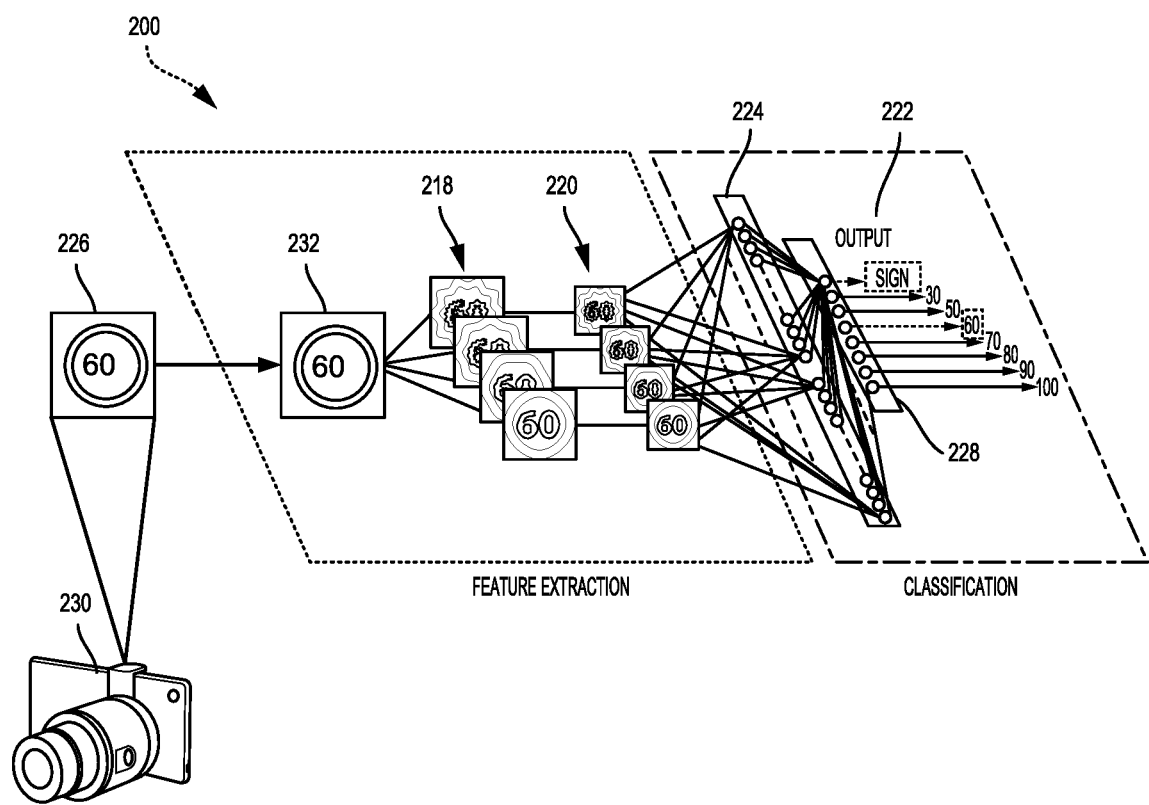
FIG. 2D illustrates aspects of a deep convolutional network (DCN) designed to recognize visual features from an image in accordance with some examples described herein.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. Such adjusting of the weights may be referred to as "back propagation" as it involves a "backward pass" through the neural network.

In practice, the error gradient of weights may be calculated over a small number of examples, so that the calculated gradient approximates the true error gradient. Such an approximation method may be referred to as stochastic gradient descent. Stochastic gradient descent may be repeated until the achievable error rate of the entire system has stopped decreasing or until the error rate has reached a target level. After learning, the DCN may be presented with new images and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction.

Figure 3:
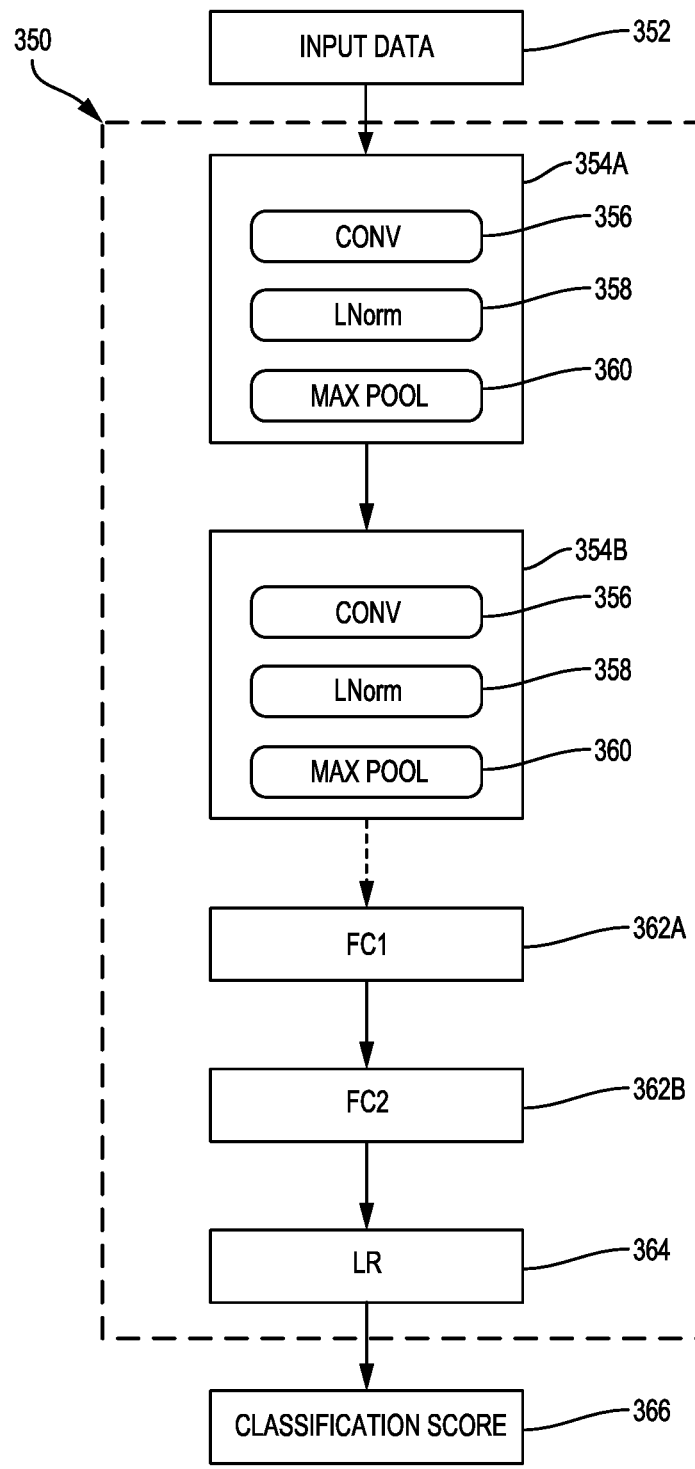
FIG. 3 is a block diagram illustrating aspects of a deep convolutional network (DCN) in accordance with examples described herein.

FIG. 3 is a block diagram illustrating an example of a deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data 352 to generate a feature map. Although only two convolution blocks 354A, 354B are shown, the present disclosure is not so limiting, and instead, any number of convolution blocks (e.g., blocks 354A, 354B) may be included in the deep convolutional network 350 according to design preference. The normalization layer 358 may balance (e.g., normalize, scale, or otherwise set the values of each convolutional filter relative to each other) the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an SOC 100 to achieve high performance and low power consumption. In alternative embodiments, the parallel filter banks may be loaded on the DSP 106 or an ISP 116 of an SOC 100. In addition, the deep convolutional network 350 may access other processing blocks that may be present on the SOC 100, such as sensor processor 114 and navigation module 120, dedicated, respectively, to sensors and navigation.

The deep convolutional network 350 may also include one or more fully connected layers, such as layer 362A (labeled "FC1") and layer 362B (labeled "FC2"). The deep convolutional network 350 may further include a logistic regression (LR) layer 364. Between each layer 356, 358, 360, 362A, 362B, 364 of the deep convolutional network 350 are weights (not shown) that are to be updated. The output of each of the layers (e.g., 356, 358, 360, 362A, 362B, 364) may serve as an input of a succeeding one of the layers (e.g., 356, 358, 360, 362A, 362B, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

As noted above, digital video data can include large amounts of data, which can place a significant burden on communication networks as well as on devices that process and store the video data. For instance, recording uncompressed video content generally results in large file sizes that greatly increase as the resolution of the recorded video content increases. In one illustrative example, uncompressed 16-bit per channel video recorded in 1080p/24 (e.g. a resolution of 1920 pixels in width and 1080 pixels in height, with 24 frames per second captured) may occupy 12.4 megabytes per frame, or 297.6 megabytes per second. Uncompressed 16-bit per channel video recorded in 4K resolution at 24 frames per second may occupy 49.8 megabytes per frame, or 1195.2 megabytes per second.

Network bandwidth is another constraint for which large video files can become problematic. For example, video content is oftentimes delivered over wireless networks (e.g., via LTE, LTE-Advanced, New Radio (NR), WiFi™, Bluetooth™, or other wireless networks), and can make up a large portion of consumer internet traffic. Despite advances in the amount of available bandwidth in wireless networks, it may still be desirable to reduce the amount of bandwidth used to deliver video content in these networks.

Because uncompressed video content can result in large files that may involve sizable memory for physical storage and considerable bandwidth for transmission, video coding techniques can be utilized to compress and then decompress such video content.

To reduce the size of video content—and thus the amount of storage involved to store video content—and the amount of bandwidth involved in delivering video content, various video coding techniques can be performed according to a particular video coding Standard, such as HEVC, AVC, MPEG, VVC, among others. Video coding often uses prediction methods such as inter-prediction or intra-prediction, which take advantage of redundancies present in video images or sequences. A common goal of video coding techniques is to compress video data into a form that uses a lower bit rate, while avoiding or minimizing degradations in the video quality. As the demand for video services grows and new video services become available, coding techniques with better coding efficiency, performance, and rate control are needed.

In general, an encoding device encodes video data according to a video coding Standard to generate an encoded video bitstream. In some examples, an encoded video bitstream (or "video bitstream" or "bitstream") is a series of one or more coded video sequences. The encoding device can generate coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments. In HEVC, the slices are partitioned into coding tree blocks (CTBs) of luma samples and chroma samples. A CTB of luma samples and one or more CTBs of chroma samples, along with syntax for the samples, are referred to as a coding tree unit (CTU). A CTU may also be referred to as a "tree block" or a "largest coding unit" (LCU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy (IBC) prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which a residual transform (e.g., the same two-dimensional transform in some cases) is applied for coding a prediction residual signal. A transform unit (TU) represents the TBs of luma and chroma samples, and corresponding syntax elements. Transform coding is described in more detail below.

According to the HEVC standard, transformations may be performed using TUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoding device.

Once the pictures of the video data are partitioned into CUs, the encoding device predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

After performing prediction using intra- and/or inter-prediction, the encoding device can perform transformation and quantization. For example, following prediction, the encoding device may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., issuing inter-prediction or intra-prediction), the encoding device can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some embodiments, a TU may be used for the transform and quantization processes implemented by the encoding device. A given CU having one or more PUs may also include one or more TUs. As described in further detail below, the residual values may be transformed into transform coefficients using the block transforms, and then may be quantized and scanned using TUs to produce serialized transform coefficients for entropy coding.

The encoding device may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoding device. In some examples, the encoding device may utilize a predefined scan order to scan the quantized transform coefficients to produce a serialized vector that can be entropy encoded. In some examples, encoding device may perform an adaptive scan. After scanning the quantized transform coefficients to form a vector (e.g., a one-dimensional vector), the encoding device may entropy encode the vector. For example, the encoding device may use context adaptive variable length coding, context adaptive binary arithmetic coding, syntax-based context-adaptive binary arithmetic coding, probability interval partitioning entropy coding, or another suitable entropy encoding technique.

The encoding device can store the encoded video bitstream and/or can send the encoded video bitstream data over a communications link to a receiving device, which can include a decoding device. The decoding device may decode the encoded video bitstream data by entropy decoding (e.g., using an entropy decoder) and extracting the elements of one or more coded video sequences making up the encoded video data. The decoding device may then rescale and perform an inverse transform on the encoded video bitstream data. Residual data is then passed to a prediction stage of the decoding device. The decoding device then predicts a block of pixels (e.g., a PU) using intra-prediction, inter-prediction, IBC, and/or other type of prediction. In some examples, the prediction is added to the output of the inverse transform (the residual data). The decoding device may output the decoded video to a video destination device, which may include a display or other output device for displaying the decoded video data to a consumer of the content.

Video coding systems and techniques defined by the various video coding Standards (e.g., the HEVC video coding techniques described above) may be able to retain much of the information in raw video content and may be defined a priori based on signal processing and information theory concepts. However, in some cases, a machine learning (ML)-based image and/or video system can provide benefits over non-ML based image and video coding systems, such as an end-to-end neural network-based image and video coding (E2E-NNVC) system. As described above, many E2E-NNVC systems are designed as combination of an auto encoder sub-network (the encoder sub-network) and a second sub-network responsible for learning a probabilistic model over quantized latents used for entropy coding. Such an architecture can be viewed as a combination of a transform plus quantization module (encoder sub-network) and the entropy modelling sub-network module.

Figure 4:
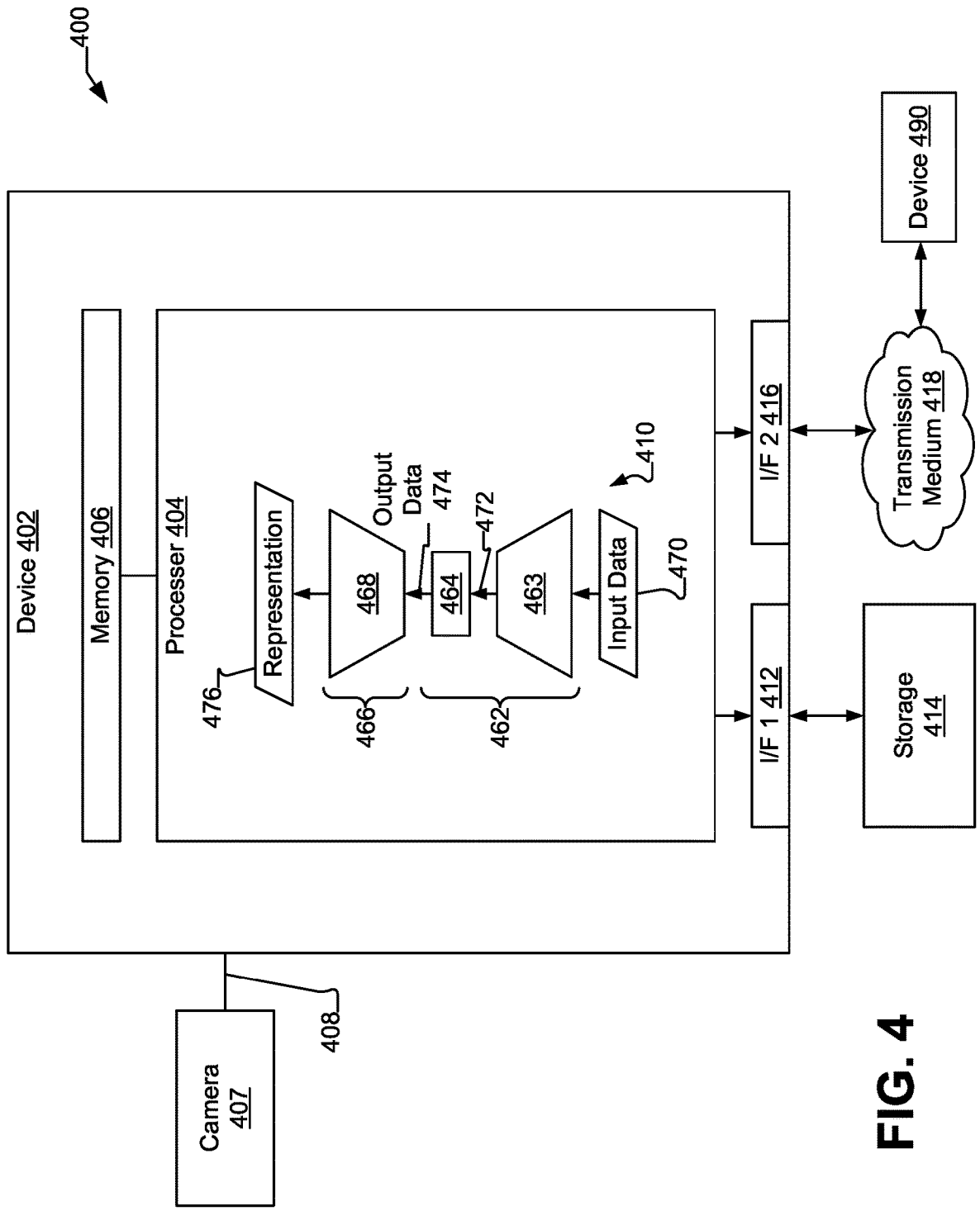
FIG. 4 is a diagram illustrating an example of a system including a device operable to perform image and/or video coding (e.g., encoding and decoding) using a neural network-based system, in accordance with some examples.

FIG. 4 depicts a system 400 that includes a device 402 configured to perform video encoding and decoding using an E2E-NNVC system 410. The device 402 is coupled to a camera 407 and a storage medium 414 (e.g., a data storage device). In some implementations, the camera 407 is configured to provide the image data 408 (e.g., a video data stream) to the processor 404 for encoding by the E2E-NNVC system 410. In some implementations, the device 402 can be coupled to and/or can include multiple cameras (e.g., a dual-camera system, three cameras, or other number of cameras). In some cases, the device 402 can be coupled to a microphone and/or other input device (e.g., a keyboard, a mouse, a touch input device such as a touchscreen and/or touchpad, and/or other input device). In some examples, the camera 407, the storage medium 414, microphone, and/or other input device can be part of the device 402.

The device 402 is also coupled to a second device 490 via a transmission medium 418, such as one or more wireless networks, one or more wired networks, or a combination thereof. For example, the transmission medium 418 can include a channel provided by a wireless network, a wired network, or a combination of a wired and wireless network. The transmission medium 418 may form part of a packet-based network, such as a local area network, a wide-area network, or a global network such as the Internet. The transmission medium 418 may include routers, switches, base stations, or any other equipment that may be useful to facilitate communication from the source device to the receiving device. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

The device 402 includes one or more processors (referred to herein as "processor") 404 coupled to a memory 406, a first interface ("I/F 1") 412, and a second interface ("I/F 2") 416. The processor 404 is configured to receive image data 408 from the camera 407, from the memory 406, and/or from the storage medium 414. The processor 404 is coupled to the storage medium 414 via the first interface 412 (e.g., via a memory bus) and is coupled to the transmission medium 418 via the second interface 416 (e.g., a network interface device, a wireless transceiver and antenna, one or more other network interface devices, or a combination thereof).

The processor 404 includes the E2E-NNVC system 410. The E2E-NNVC system 410 includes an encoder portion 462 and a decoder portion 466. In some implementations, the E2E-NNVC system 410 can include one or more auto-encoders. The encoder portion 462 is configured to receive input data 470 and to process the input data 470 to generate output data 474 at least partially based on the input data 470.

In some implementations, the encoder portion 462 of the E2E-NNVC system 410 is configured to perform lossy compression of the input data 470 to generate the output data 474, so that the output data 474 has fewer bits than the input data 470. The encoder portion 462 can be trained to compress input data 470 (e.g., images or video frames) without using motion compensation based on any previous representations (e.g., one or more previously reconstructed frames). For example, the encoder portion 462 can compress a video frame using video data only from that video frame, and without using any data of previously reconstructed frames. Video frames processed by the encoder portion 462 can be referred to herein as intra-predicted frame (I-frames). In some examples, I-frames can be generated using traditional video coding techniques (e.g., according to HEVC, VVC, MPEG-4, or other video coding Standard). In such examples, the processor 404 may include or be coupled with a video coding device (e.g., an encoding device) configured to perform block-based intra-prediction, such as that described above with respect to the HEVC Standard. In such examples, the E2E-NNVC system 410 may be excluded from the processor 404.

In some implementations, the encoder portion 462 of the E2E-NNVC system 410 can be trained to compress input data 470 (e.g., video frames) using motion compensation based on previous representations (e.g., one or more previously reconstructed frames). For example, the encoder portion 462 can compress a video frame using video data from that video frame and using data of previously reconstructed frames. Video frames processed by the encoder portion 462 can be referred to herein as intra-predicted frame (P-frames). The motion compensation can be used to determine the data of a current frame by describing how the pixels from a previously reconstructed frame move into new positions in the current frame along with residual information.

Figure 6:
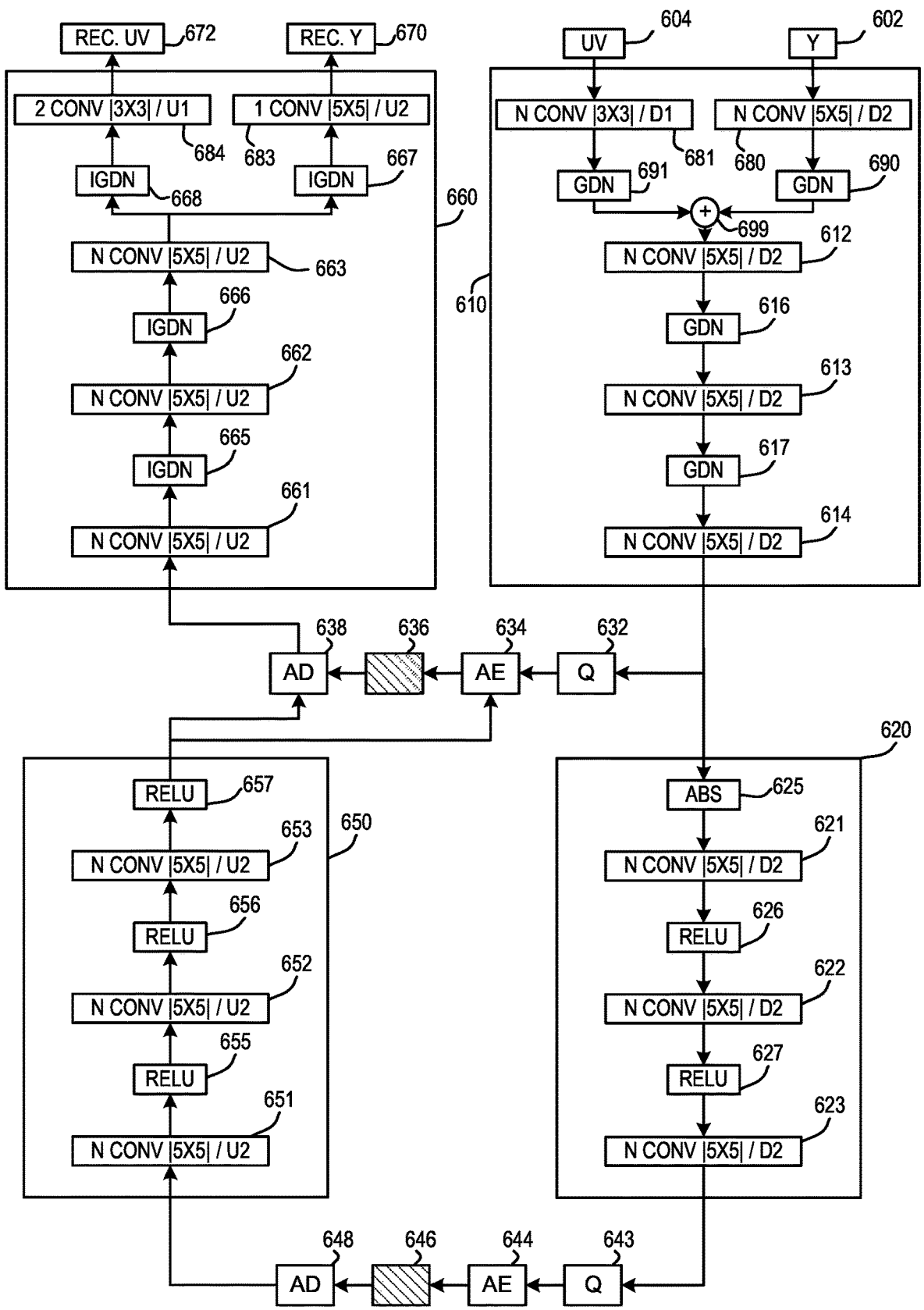
FIG. 6 is a diagram illustrating an example of an end-to-end neural network based image and video coding system for an input having a luminance-chrominance (YUV) format, in accordance with some examples.

As shown, the encoder portion 462 of the E2E-NNVC system 410 can include a neural network 463 and a quantizer 464. The neural network 463 can include one or more convolutional neural networks (CNNs), one or more fully-connected neural networks, one or more gated recurrent units (GRUs), one or more Long short-term memory (LSTM) networks, one or more ConvRNNs, one or more ConvGRUs, one or more ConvLSTMs, one or more GANs, any combination thereof, and/or other types of neural network architectures that generate(s) intermediate data 472. The intermediate data 472 is input to the quantizer 464. Examples of components that may be included in the encoder portion 462 are illustrated in FIG. 6.

The quantizer 464 is configured to perform quantization and in some cases entropy coding of the intermediate data 472 to produce the output data 474. The output data 474 can include the quantized (and in some cases entropy coded) data. The quantization operations performed by the quantizer 464 can result in the generation of quantized codes (or data representing quantized codes generated by the E2E-NNVC system 410) from the intermediate data 472. The quantization codes (or data representing the quantized codes) can also be referred to as latent codes or as a latent (denoted as z). The entropy model that is applied to a latent can be referred to herein as a "prior". In some examples, the quantization and/or entropy coding operations can be performed using existing quantization and entropy coding operations that are performed when encoding and/or decoding video data according to existing video coding Standards. In some examples, the quantization and/or entropy coding operations can be done by the E2E-NNVC system 410. In one illustrative example, the E2E-NNVC system 410 can be trained using supervised training, with residual data being used as input and quantized codes and entropy codes being used as known output (labels) during the training.

The decoder portion 466 of the E2E-NNVC system 410 is configured to receive the output data 474 (e.g., directly from quantizer 464 and/or from the storage medium 414). The decoder portion 466 can process the output data 474 to generate a representation 476 of the input data 470 at least partially based on the output data 474. In some examples, the decoder portion 466 of the E2E-NNVC system 410 includes a neural network 468 that may include one or more CNNs, one or more fully-connected neural networks, one or more GRUs, one or more Long short-term memory (LSTM) networks, one or more ConvRNNs, one or more ConvGRUs, one or more ConvLSTMs, one or more GANs, any combination thereof, and/or other types of neural network architectures. Examples of components that may be included in the decoder portion 466 are illustrated in FIG. 6.

The processor 404 is configured to send the output data 474 to at least one of the transmission medium 418 or the storage medium 414. For example, the output data 474 may be stored at the storage medium 414 for later retrieval and decoding (or decompression) by the decoder portion 466 to generate the representation 476 of the input data 470 as reconstructed data. The reconstructed data can be used for various purposes, such as for playback of video data that has been encoded/compressed to generate the output data 474. In some implementations, the output data 474 may be decoded at another decoder device that matches the decoder portion 466 (e.g., in the device 402, in the second device 490, or in another device) to generate the representation 476 of the input data 470 as reconstructed data. For instance, the second device 490 may include a decoder that matches (or substantially matches) the decoder portion 466, and the output data 474 may be transmitted via the transmission medium 418 to the second device 490. The second device 490 can process the output data 474 to generate the representation 476 of the input data 470 as reconstructed data.

The components of the system 400 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

While the system 400 is shown to include certain components, one of ordinary skill will appreciate that the system 400 can include more or fewer components than those shown in FIG. 4. For example, the system 400 can also include, or can be part of a computing device that includes, an input device and an output device (not shown). In some implementations, the system 400 may also include, or can be part of a computing device that includes, one or more memory devices (e.g., one or more random access memory (RAM) components, read-only memory (ROM) components, cache memory components, buffer components, database components, and/or other memory devices), one or more processing devices (e.g., one or more CPUs, GPUs, and/or other processing devices) in communication with and/or electrically connected to the one or more memory devices, one or more wireless interfaces (e.g., including one or more transceivers and a baseband processor for each wireless interface) for performing wireless communications, one or more wired interfaces (e.g., a serial interface such as a universal serial bus (USB) input, a lightening connector, and/or other wired interface) for performing communications over one or more hardwired connections, and/or other components that are not shown in FIG. 4.

In some implementations, the system 400 can be implemented locally by and/or included in a computing device. For example, the computing device can include a mobile device, a personal computer, a tablet computer, a virtual reality (VR) device (e.g., a head-mounted display (HMD) or other VR device), an augmented reality (AR) device (e.g., an HMD, AR glasses, or other AR device), a wearable device, a server (e.g., in a software as a service (SaaS) system or other server-based system), a television, and/or any other computing device with the resource capabilities to perform the techniques described herein.

In one example, the E2E-NNVC system 410 can be incorporated into a portable electronic device that includes the memory 406 coupled to the processor 404 and configured to store instructions executable by the processor 404, and a wireless transceiver coupled to an antenna and to the processor 404 and operable to transmit the output data 474 to a remote device.

Figure 5A:
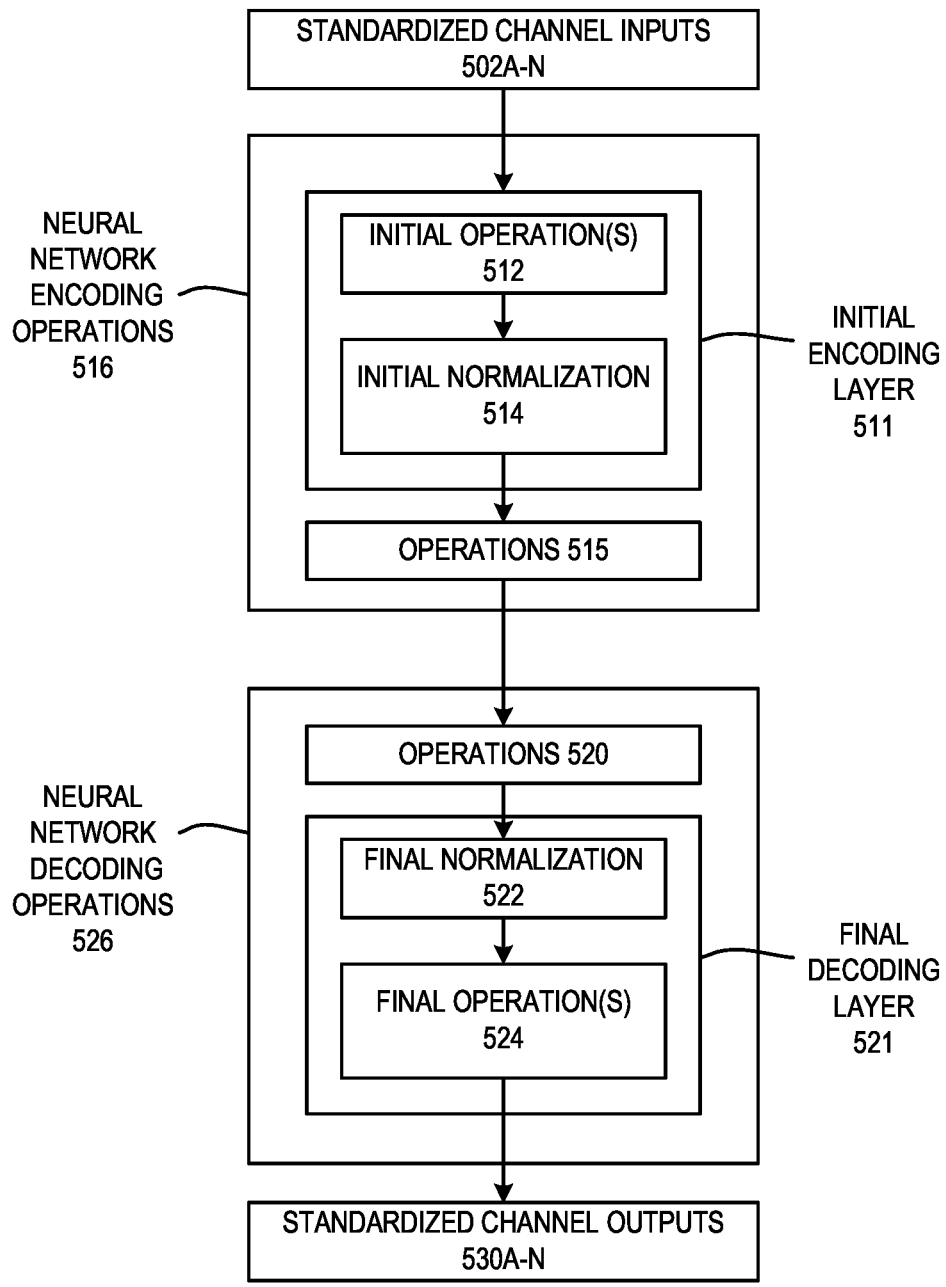
FIG. 5A is a diagram illustrating aspects of a neural network based image and video coding system.
Figure 5B:
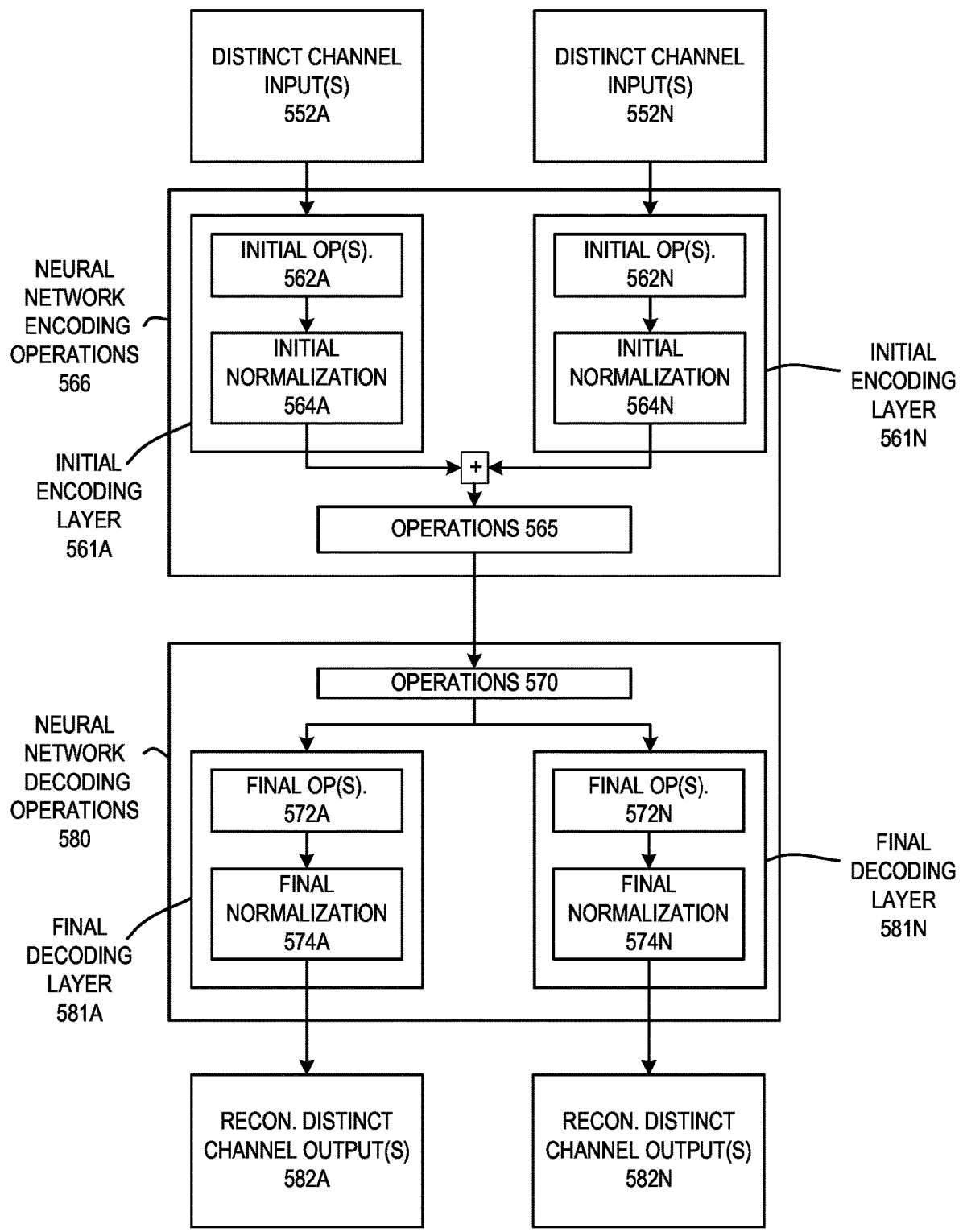
FIG. 5B is a diagram illustrating aspects of a neural network based image and video coding system in accordance with examples described herein.

FIG. 5A and FIG. 5B are examples of machine learning (e.g., neural network) structures that can implement efficient E2E-NNVC for video formats with channels having different characteristics. For example, FIG. 5A is a diagram illustrating a machine-learning based video coding system where frames of the video coding data are divided among standardized channel inputs (e.g., the three channels of an RGB format frame). The shared characteristics of standardized channel data for the standardized channel inputs 502A-N allows all channels to be processed using the same structures in shared layers. The standardized channel inputs 502A-N can include any number of channels with shared characteristics. One example where the standardized channel inputs are for RGB format data would include three channels, including a red (R) channel, a green (G) channel, and a blue (B) channel. Other examples can include any number of channels with shared characteristics (e.g., shared resolutions, with the same number of pixels along each dimension of the video data, and shared statistical characteristics for the video data, such as shared mean and variance characteristics for pixel values).

As illustrated by FIG. 5A, the neural network encoding operations 516 include an initial encoding layer 511 and additional operations 515. The initial encoding layer 511 includes initial operations 512 and an initial normalization 514. The initial operations 512 can include a filtering operation, a desampling operation, or any such operations for video coding as described herein. The initial normalization 514 can include any processing to organize, format, and/or modify the data from the standardized channel inputs 502A-N to prepare the data for additional processing layers in the neural network encoding operations 516. The additional operations 515 can include any number of processing layers and normalization steps as part of a machine learning structure for video coding. In some cases, the normalization steps can include scaling steps or other operations that can perform similar operations. In the example of FIG. 5A, each separate channel of the standardized channel inputs 502A-N is processed using the same flow of the neural network encoding operations 516. After encoding is completed, the output encoded data can be stored, transmitted, and/or used in any way as part of a video coding system.

Neural network decoding operations 526 are the inverse of the neural network encoding operations 516. In the neural network decoding operations 526, the encoded data from the neural network encoding operations 516 is accessed, either from a storage medium or from a transmission system, and the inverse neural network coding operations are performed to decode the video data. The decoding includes operations 520 to reverse operations 515, and final decoding layer 521 to reverse the operations of the initial encoding layer 511. The final normalization 522 and the final operation 524 generate the reconstructed video data which are output as the standardized channel outputs 530A-N.

As described above, the single pathway from the standardized channel inputs 502A-N to the standardized channel outputs 530A-N is dependent on the shared characteristics of each of the channels of the video data for the video format (e.g., RGB format video data). In order to use the structure of FIG. 5A with a video format where channels have different characteristics, a separate copy would be needed for each type of channel with different characteristics, or a format conversion precedes the encoding and follows the decoding. For YUV format data, the data could be converted to RGB data prior to the initial encoding layer 511 and converted back to YUV data following the final operations 524. Such conversion uses significant resources. Alternatively, a first copy of the structure of FIG. 5A would be needed for Y channel, and a second copy would be needed for the two U and V channels (e.g., which share characteristics). Such duplication uses significant resources. Examples described herein improve the operation of E2E-NNVC systems by reducing the resources needed to handle video formats with channels having different characteristics, such as YUV format data.

FIG. 5B is a diagram illustrating aspects of a neural network based image and video coding system in accordance with examples described herein. The system of FIG. 5B is similar to the system of FIG. 5A, but the shared initial encoding layer 511 is replaced with separate initial encoding layers 561A through 561N of neural network encoding operations 566, and the shared final decoding layer 521 of FIG. 5A is replaced with separate final decoding layers 581A through 581N of neural network decoding operations 580.

In the example of FIG. 5B, the separate initial encoding layers 561A through 561N handle the different distinct channel inputs 552A and 552N. Each of the separate initial encoding layers can process more than one channel, so long as the channels share characteristics as described above. As part of the neural network encoding operations 566 to encode video data using the system of FIG. 5B, input data from different channels of the video frames are input as distinct channel inputs 552A and distinct channel inputs 552N. The distinct channel inputs 552A are processed by the initial encoding layer 561A, and the distinct channel inputs 552N are processed by the initial encoding layer 561N. The separate initial encoding layers 561A through 561N use separate initial operations 562A and 562N. Separate initial normalization operations 564A and 564N are used to take the data with different characteristics from the distinct channel inputs 552A and the distinct channel inputs 552N to create data that is standardized so that it can be joined (e.g., merged) and processed together in subsequent layers of operations 565. For example, if the distinct channel inputs 552A includes Y channel (e.g., luminance) data at a higher resolution, and the distinct channel inputs 552N includes U and V channel (e.g., chrominance) data at a lower resolution, initial operations 562N can include a downsampling operation to lower the resolution to a shared resolution to be used by both types of data at the beginning of the operations 565. Similarly, the initial operations 562A and the initial operations 562N may both include filtering operations, but the higher resolution data (e.g., prior to downsampling) may be processed with a larger filter. Similarly, the initial normalization operations 564A and 564N can apply different data transformations to the different types of data to standardize the statistical characteristics of the data to allow the different types of data to be processed by shared neural network layers in the operations 565.

The corresponding neural network decoding operations 580 share a similar structure. Shared operations 570 reverse the encoding of the operations 565, and the data for the separate channels is then split for a final decoding layer 581A and a final decoding layer 581N. The final decoding layer 581A performs final operations 572A and final normalization 574A to reconstruct the distinct channel inputs 552A through 552N as reconstructed distinct channel outputs 582A through 582N. The final decoding layer 581N performs final operations 572N and the final normalization 574N to reconstruct the distinct channel inputs 552N as reconstructed distinct channel outputs 582N.

While the operations 565 and 570 take up a small space in the illustration of FIG. 5B, in various implementations, these operations can be the majority of the allocated physical resources (e.g., use over time of neural network processing circuitry), with any number of layers (e.g., 5 layers, 9 layers, etc.) as part of a neural network structure in addition to the initial encoding layers 561A through 561N and the final decoding layers 581A through 581N. Standardizing the distinct channels can thus significantly reduce duplication in the pipelines of E2E-NNVC for video formats with channels having distinct characteristics, as detailed further by the example below.

FIG. 6 is a diagram illustrating an example of an end-to-end neural network based image and video coding system for an input having a luminance-chrominance (YUV) format, in accordance with some examples. The example network of the video coding system of FIG. 6 accepts YUV data in a Y channel input 602 and a UV channel input 604, and outputs a reconstructed Y channel 670 and reconstructed U and V channels 672. The video coding system of FIG. 6 further includes a $g_a$ sub-network 610 and a sub-network $g_s$ 660, as well as sub-networks 620 and 650. The $g_a$ sub-network 610 corresponds to an encoder sub-network (e.g., the encoder portion 462) and the sub-network $g_s$ 660 corresponds to a decoder sub-network (e.g., the decoder portion 466). The $g_a$ and $g_s$ sub-networks use additional operations that can be structured similarly to a system for processing a three-channel RGB input, where all three R, G, and B input channels are processed by the same neural network layers (e.g., the convolutional layers and generalized divisive normalization (GDN) layers), but modified with initial encoding layers and final decoding layers to process YUV format data where channels have different characteristics.

The illustrated sub-networks include convolutional layers 612, 613, 614, 661, 662, and 663, as well as generalized divisive normalization (GDN) layers 691, 690, 616, and 614 or inverse GDN (IGDN) layers 665, 666, 667, and 668. The various layers can be considered as neural network layers in various groups. The neural network layers in such a structure (e.g., a neural network layer combining GDN layer 617 and convolutional layer 614) can include convolutional layers that perform convolutional operations and GDN and/or inverse-GDN (IGDN) nonlinearity layers that implement local divisive normalization. Local divisive normalization is a type of transformation that has been shown to be particularly suitable for density modelling and compression of images. E2E-NNVC systems for channel data channels with similar statistical characteristic (e.g., similar mean pixel values or similar variance among pixel values), such as RGB data (e.g., where statistical properties of the different R, G, and B channels such as mean and variance characteristics are similar).

As described above, while E2E-NNVC systems are typically designed with a single coding path (e.g., similar to FIG. 5A) to process RGB input, most image and video coding systems use YUV input formats (e.g., in many cases the YUV420 input format). The chrominance (U and V) channels of data in the YUV format can be subsampled with respect to the luminance (Y) channel. The subsampling results in a minimal impact on visual quality (e.g., there is no significant or noticeable impact on visual quality, due to characteristics of human perception, where brightness changes are more noticeable than similar magnitude changes in hue or color appearance parameters). Subsampled formats include the YUV420 format, the YUV422 format, and/or other YUV formats. The correlation across channels is reduced in the YUV format (e.g., Y channels typically have different characteristics than U or V channels), which may not be the case with other color formats (e.g., the RGB format). Further, the statistical characteristics of the luminance (Y) and chrominance (U and V) channels are typically different. For instance, the U and V channels typically have smaller variance as compared to the luminance channel, whereas in the RGB formats for example, the statistical properties of the different R, G, and B channels are more similar. The differences in such statistical properties leads to the associated channels having sufficiently different characteristics, that the same video coding path used for such different channels will have degraded results, either from lower video quality or excessive use of device resources. Video coders-decoders (or CODECs) are designed according to the input characteristics of data (e.g., a CODEC can encode and/or decode data according to the input format of the data). For example, if the chrominance channels of a frame are subsampled (e.g., the chrominance channels are half the resolution as compared to the luminance channel), then when a CODEC predicts a block of the frame for motion compensation, the luminance block would be twice as large for both width and height as compared to the chrominance blocks. In another example, the CODEC can determine how many pixels are going to be encoded or decode for chrominance and luminance, among others.

If RGB input data (which, as noted above, most E2E-NNVC systems are designed to process) is replaced with YUV 444 input data (where all channels have the same dimension), the performance of the E2E-NNVC system processing the input data is reduced due to different statistical characteristics of the luminance (Y) and chrominance (U and V) channels, even though the channel resolutions are the same. As noted above, the chrominance (U and V) channels are subsampled in some YUV formats, such as in the case of YUV420. For instance, for content having the YUV420 format, the U and V channel resolution is half of the Y channel resolution (the U and V channels have a size that is a quarter of the Y channel, due to the width and height being halved). Such subsampling can cause the input data to be incompatible with the input of the E2E-NNVC system. The input data is the information that the E2E-NNVC system is attempting to encode and/or decode (e.g., a YUV frame that includes three channels, including the luminance (Y) and chrominance (U and V) channels). Many neural network-based systems assume all channel dimensions of the input data are the same, and thus feed all of the input channels to the same network. In such cases, the outputs of certain operations can be added (e.g., using matrix addition), in which case the dimensions of the channels have to be the same. Such issues can be addressed by converting YUV data to RGB data with limited loss, but such conversion operations are resource intensive.

The video coding system of FIG. 6 is configured with separate initial convolution layers 681 and 680 to address such issues. In the example of FIG. 6, the Y channel inputs 602 can be subsampled into four half resolution Y channels in convolution layer 680. The U and V inputs 604 can be processed in convolution layer 681 without subsampling. The four half resolution Y channels from layer 680 can be balanced (e.g., normalized, scaled, or otherwise modified) by the GDN layer 690 and can be combined with the two chrominance channels from layer 681 and the GDN layer 691 in merging structure 699, resulting in six input channels with shared inputs. Operations that can be used to balance channel data include adjusting, normalizing, scaling, or otherwise comparatively modifying (e.g., to balance) the pixel values within the data. The six input channels can be input or fed into the illustrated flow of neural network layers as part of the E2E-NNVC system of FIG. 6 designed for RGB inputs and modified with initial encoding layers (e.g., layers 681 and 680 combined with GDN layers 690 and 681) and final decoding layers (e.g., layers 683 and 684 combined with IGDN layers 667 and 668). Such an approach may address the issue with respect to resolution differences of the luminance (Y) and chrominance (U and V) channels (e.g., using different sampling or stride characteristics in the separate paths) and with respect to the statistical characteristics using the separate GDN and IGDN layers.

The video coding system of FIG. 6 illustrates an example of a system for performing image and/or video coding using one or more ML-based systems. The systems and techniques described herein provide an end-to-end neural network-based image and video coding (E2E-NNVC) system (e.g., such as the video coding system of FIG. 6) designed for processing input data that has luminance-chrominance (YUV) input formats (e.g., YUV420, YUV444, YUV422, among others). The E2E-NNVC systems described herein address the different characteristics of the luminance (Y) and chrominance (U and V) channels, as well as the difference in resolutions of the luminance (Y) and chrominance (U and V) channels. The E2E-NNVC system can encode and/or decode stand-alone frames (or images) and/or video data that includes multiple frames.

In some examples, the E2E-NNVC system described herein can input or feed the Y and UV channels into two separate layers initially (e.g., the layer 680 and the layer 681). The E2E-NNVC system can then combine data associated with the Y and UV channels after a certain number of layers (e.g., after a first convolutional and GDN layer combination) in merging structure 699. Such a technique can allow the E2E-NNVC system to handle YUV input data having different channel characteristics and resolutions. In one illustrative example, the E2E-NNVC can be designed for YUV420 input data. For YUV420 input data, because the chrominance (U and V) channels are subsampled with respect to the luminance (Y) channel, the subsampling in the first convolutional layer can be skipped and convolutional (e.g., CNN) kernels of a particular size (e.g., having a size of $(N/2+1) \times (N/2+1)$) can be used for the subsampled input chrominance (U and V) channels in the distinct (e.g., not shared) layers 681 and 680. CNN kernels having a different size (e.g., N×N CNN kernels) as compared to the kernel used for the chrominance (U and V) channels can then be used for the luminance (Y) channel. In another illustrative example, a same kernel size can be used for both the luminance (Y) and the chrominance (U and V) channels. For instance, in the case of YUV444 input data, the same kernel size with the same subsampling (e.g., a subsampling of 2, where the output is subsampled by 2 in each dimension, sometimes referred to as stride 2, and every other sample in both dimensions is discarded) in the first convolutional layer can be used for all channels Y, U, and V.

The above examples (e.g., with a subsampling of 2 used on the Y channel inputs 602) are described in the context of YUV 420 data formats. It will be apparent that similar neural network architecture can be used for encoding and/or decoding other types of YUV content (e.g., YUV444, YUV422, etc.) and/or content having other input formats where channels have different characteristics.

As shown in FIG. 6, the input processing is modified by separately processing the luminance (Y) and chrominance (U and V) channels (e.g., the Y and UV channels of a particular input image or video frame) shown as inputs 602 and 604 connected in the first two neural network layers in the encoder sub-network 610 and in the correspond the decoder sub-network $g_s$ 660. For example, the first two neural network layers in the encoder sub-network $g_a$ include a first convolutional layer 681 (denoted Nconv|3×3|↓1), a second convolutional layer 680 (denoted Nconv|5×5|↓2), and two GDN layers 691 and 690. The last two neural network layers in the decoder sub-network $g_s$ 660 include two inverse-GDN (IGDN) layers 667 and 668, a first convolutional layer 684 (denoted 2conv|3×3|↑1) for generating the reconstructed chrominance (U and V) components of a frame, and a second convolutional layer 683 (denoted 1conv|5×5|↑2) for generating the reconstructed luminance (Y) component of the frame. The "Nconv" notation refers to a number of output channels (corresponding to a number of output features) of a given convolutional layer (with a value N defining the number of output channels). The 3×3 and 5×5 notation indicates the size of the respective convolutional kernels (e.g., a 3×3 kernel and a 5×5 kernel). The "↓1" and "↓2" (e.g., D1 and D2) notation refers to stride values, where ↓1 refers to a stride of 1 (for downsampling as indicated by the "↓" or D) and ↓2 refers to a stride of 1 (for downsampling). The "↑1" and "↑2" (e.g., U1 and U2) notation refers to refers to stride values, where ↑1 refers to a stride of 1 (for upsampling as indicated by the "↑" or U) and ↑2 refers to a stride of 1 (for upsampling).

In addition to sub-networks 610 and 660, the example video coding system of FIG. 6 includes sub-networks 620 and 650. The sub-networks 620 and 650 are additional encoding and decoding networks that can be used to improve video coding performance using an entropy model h. ABS layer 625 performs an absolute value function (e.g., used as an activation function in the neural network). Rectified linear unit (ReLU) layers 626, 627, 655, 656, and 657 transform an input to a maximum of the input value or zero (e.g., replacing negative data with zero values). Layers 621, 622, 623, 651, 652, and 653 are convolutional layers. The data output from sub-network 610 includes the coefficients that are being encoded or decoded (e.g., the output of a quantized transform), including data input to the quantizer (Q) 632 and data output by the arithmetic decoder (AD) 638. Data output from sub-network 620 represents the parameters that describe the entropy models $h_a$ and $h_s$ (e.g., referred to as a hyperprior and described in more detail below) of corresponding sub-networks 620 for entropy model $h_a$, and entropy model $h_s$ for sub-network 650. The data output from sub-network 620 is quantized by the Q 643, set as binary data 646 by the encoder (AE) 644, and then output as modified data from AD 648 which is input to sub-network 650.

In the example network of the video coding system shown in FIG. 6, the upper sub-networks 610 and 660 implement an image auto encoder architecture, and the lower sub-networks 620 and 650 implement a hyperprior network. Input data (e.g., from U and V channel inputs 604 and Y channel inputs 602) is encoded by sub-network 610, which outputs data which includes spatially varying standard deviations. The data output from sub-network 610 is input to both Q 632 and sub-network 620 implementing entropy model $h_a$. Sub-network 620 essentially summarizes the distribution of standard deviations (e.g., z data) from the data output from sub-network 610. The z data is then processed by Q 642, which outputs a quantized vector used by sub-network 650 and entropy model $h_s$ to estimate a spatial distribution of the standard deviations. The quantized vector estimating the spatial distribution of the standard deviation of the video data is the output of sub-network 650.

Q 632 generates a quantized image representation using the data output from sub-network 610 (e.g., the encoding network). The AE 634 uses the quantized image representation from Q 632 with the estimated spatial distribution of the standard deviations output from sub-network 650 to compress and transmit the quantized image representation into binary data 636. AD 638 uses the estimated spatial distribution of the standard deviations output from the sub-network 650 with the compressed transmitted binary data 636 to recover the quantized image representation (e.g., generated by Q 632). The recovered quantized image representation is output from the AD 638 to the sub-network $g_s$ 660. The sub-network 660 then decodes the quantized image representation to create the data for recovered U and V channels 672 and recovered Y channel 670.

The example described with respect to the video coding system of FIG. 6 is one example of an implementation in accordance with the descriptions provided herein. It will be apparent that other implementations are possible, including implementations structured to handle more than two different types of channels, or other such configurations.

In some examples, the system of FIG. 6 can be structured as a single path system configured for RGB data with one or more additional initial input layers to adapt channels with different characteristics. For example, in the encoder sub-network $g_a$ 610 in FIG. 6, the second convolutional layer 680 (e.g., the Nconv |5×5|↓2 layer of the encoder sub-network 610 $g_a$) used to process the luminance (Y) channel can be the same as the convolutional layer of an encoder sub-network $g_a$ for processing RGB channel data. In such a structure, layer 681 and merging structure 699 are added to enable YUV processing capability and RGB processing capability in the same structure. In such an example, the second convolutional layer 683 (denoted 1conv|5×5|↑2) of the decoder sub-network $g_s$ 660 used to generate the reconstructed luminance (Y) component can be the same as the last convolutional layer of a decoder sub-network $g_s$ with a single path for coding RGB format data. Unlike the single path system, the chrominance (U and V) channels are processed by the system of FIG. 6 using a convolutional layer 681 (the Nconv |3×3|↓1 layer of the encoder sub-network $g_a$ 610) that has a kernel size that is half the size (and without downsampling, corresponding to a stride equal to 1) of the kernel used in the Nconv |5×5|↓2 convolutional layer 680 used to process the luminance (Y) channel (e.g., (N+1)/2, so (N+1)/2*(N+1)/2)), followed by the GDN layer 690. After the convolutional layers 680 and 681 (the Nconv |5×5|↓2 and the Nconv |3×3|↓1 layers) and the corresponding GDN layers 690 and 691, the representation or features of the luminance (Y) channel and chrominance (U and V)

channels (e.g., a transformed or filtered version of the input channels and input to merging structure 699) have the same dimension and they are combined by summation. The Y channel data input to merging structure 699 thus has similar characteristics to the U and V channel data input to merging structure 699, which allows the remaining layers to be shared.

In one example, the luminance (Y) channel is twice the size in each dimension as the chrominance (U and V) channels. When the chrominance (U and V) channels are subsampled by 2, the output generated based on processing those channels becomes the same dimension as the conv2d output of the luminance channel (because the luminance channel is not subsampled). The separate normalization of channels addresses the difference in variance of the luminance and chrominance channels. In the decoder sub-network $g_s$ 660, separate I-GDN layers 667 and 668 and convolutional layers 683 and 684 are used to separately generate the reconstructed luminance (Y) component and the reconstructed chrominance (U and V) components. For instance, the convolutional layer 684 (e.g., the 2conv |3×3|↑1 layer of the decoder sub-network $g_s$ 660) is used to generate the reconstructed U and V channels 672 with a kernel size that is approximately half the size (and without upsampling, corresponding to a stride equal to 1) of the kernel used in the 1conv |5×5|↑2 convolutional layer 683 used to generate the reconstructed Y channel 670 (e.g., luminance) component.

In some examples, the systems and techniques described herein can be used for other encoder-decoder sub-networks that use convolutional (e.g., CNN) and normalization stage combinations at the input of the neural network based coding system.

Figure 7:
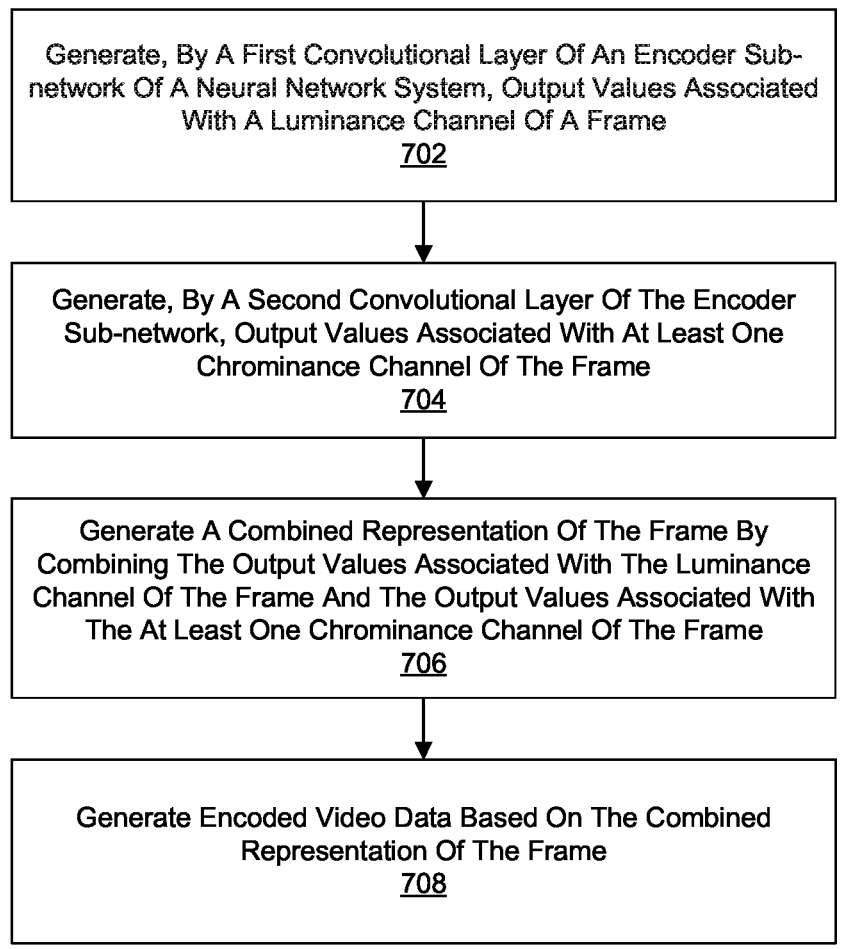
FIG. 7 is a flowchart illustrating an example of a process for processing video data, in accordance with some examples.

FIG. 7 is a flowchart illustrating an example of a process 700 of processing video using one or more of the recurrent-based machine learning techniques described herein. Process 700 can, for example be implemented as a SOC 100, device 402, or any device implemented using computing device architecture 900 as described herein. In some examples, process 700 is implemented as instructions stored in a non-transitory computer readable medium that, when executed by one or more processors of a device, cause the device to perform operations of process 700.

At block 702, the process 700 includes generating, by a first convolutional layer of an encoder sub-network of a neural network system, output values associated with a luminance channel of a frame. For example, as described above with respect to FIG. 6, convolutional layer 680 of encoder sub-network 610 of a neural network system outputs values associated with Y-channel (e.g., luminance channel) inputs for a frame.

At block 704, the process 700 includes generating, by a second convolutional layer of the encoder sub-network, output values associated with at least one chrominance channel of the frame. In the example of FIG. 6, convolutional layer 681 of encoder sub-network 610 outputs values associated with UV-channel inputs 604 (e.g., at least one chrominance channel) of the frame.

At block 706, the process 700 includes generating a combined representation of the frame by combining the output values associated with the luminance channel of the frame and the output values associated with the at least one chrominance channel of the frame. In the corresponding structure of FIG. 6, the output values of convolutional layers 681 and 680 are combined at merging structure 699.

At block 708, the process 700 includes generating encoded video data based on the combined representation of the frame. In the example of FIG. 6, the combined values generated by merging structure 699 are then processed by additional convolutional layers and 614 as well as 612, 613, and 614 as well as GDN layers 616, 617. Quantizer 632 and encoder 634 are then used to generate encoded video data based on the combined representation of the frame from merging structure 699.

In some examples, the process 700 includes processing, using a first normalization layer of the encoder sub-network, the output values associated with a luminance channel of the frame; and processing, using a second normalization layer of the encoder sub-network, the output values associated with at least one chrominance channel of the frame. In such examples, the combined representation is generated based on an output of the first normalization layer and an output of the second normalization layer. (e.g., using normalization layers of sub-network 620). In some examples, the methods, apparatuses, and computer-readable medium described above for encoding video data further comprise quantizing the encoded video data (e.g., using quantizer 632). In some cases, the normalization layers can be referred to as scaling layers.

In some examples, the process 700 includes entropy coding the encoded video data (e.g., using AE 634). In some examples, the process 700 includes storing the encoded video data in memory. In some examples, the process 700 includes transmitting the encoded video data over a transmission medium to at least one device.

In some examples, the process 700 includes obtaining an encoded frame; generating, by a first convolutional layer of a decoder sub-network of the neural network system, reconstructed output values associated with a luminance channel of the encoded frame; and generating, by a second convolutional layer of the decoder sub-network, reconstructed output values associated with at least one chrominance channel of the encoded frame.

In some examples, the frame includes a video frame. In some examples, the at least one chrominance channel includes a chrominance-blue channel and a chrominance-red channel. In some examples, the frame has a luminance-chrominance (YUV) format.

Figure 8:
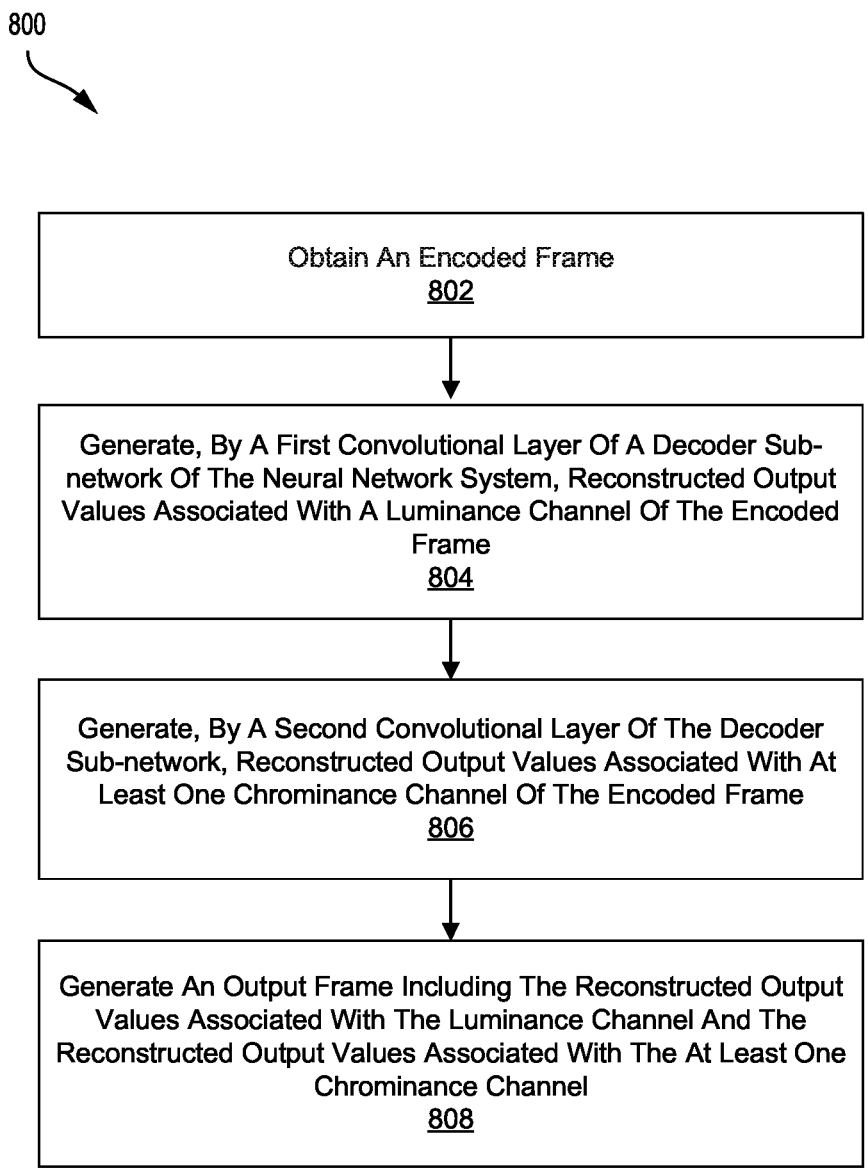
FIG. 8 is a flowchart illustrating another example of a process for processing video data, in accordance with some examples.

FIG. 8 is a flowchart illustrating an example of a process 800 of processing video using one or more of the recurrent-based machine learning techniques described herein. In some examples, process 800 can be consider corresponding decoding operations to the encoding operations of process 700. Just as above for process, 700, process 800 can, for example be implemented as a SOC 100, device 402, or any device implemented using computing device architecture 900 as described herein. In some examples, process 800 is implemented as instructions stored in a non-transitory computer readable medium that, when executed by one or more processors of a device, cause the device to perform operations of process 800.

At block 802, the process 800 includes obtaining an encoded frame. The encoded frame can, for example, include encoded video data generated in block 708 above, or in accordance with operations of any other similar process to generate an encoded frame. In the example of FIG. 6 AD 638 receives both frames of encoded video data as compressed transmitted binary data 636, as well as entropy model data generated from transmitted binary data 646 which is used to improve the quality of the decoded video data.

At block 804, the process 800 includes generating, by a first convolutional layer of a decoder sub-network of a neural network system, reconstructed output values associated with a luminance channel of the encoded frame. In the example of FIG. 6, after inverse processing of the data using convolutional layers 661, 662, and 663 corresponding to convolutional layers 614, 613, and 612, as well as IGDN layers 665 and 666, the video data is split into data to be output as reconstructed Y data to be output at reconstructed Y channel 670, and reconstructed UV data to be output as reconstructed UV channel 672.

At block 806, the process 800 includes generating, by a second convolutional layer of the decoder sub-network, reconstructed output values associated with at least one chrominance channel of the encoded frame. At block 808, the process 800 includes generating an output frame including the reconstructed output values associated with the luminance channel and the reconstructed output values associated with the at least one chrominance channel. In the example of FIG. 6, after inverse processing of the data using convolutional layers 661, 662, and 663 corresponding to convolutional layers 614, 613, and 612, as well as IGDN layers 665 and 666, the video data is split into data to be output as reconstructed Y data to be output at reconstructed Y channel 670, and reconstructed UV data to be output as reconstructed UV channel 672.

In some examples, the process 800 includes processing, using a first normalization layer of the decoder sub-network, values associated with the luminance channel of the encoded frame, wherein the reconstructed output values associated with the luminance channel are generated based on an output of the first normalization layer; and processing, using a second normalization layer of the decoder sub-network, values associated with the at least one chrominance channel of the encoded frame, wherein the reconstructed output values associated with the at least one chrominance channel are generated based on an output of the second normalization layer (e.g., using normalization layers of sub-network 650).

In some examples, process 800 includes dequantizing samples of the encoded frame. In some examples, process 800 includes entropy decoding samples of the encoded frame (e.g., using AD 638). In some examples, process 800 includes storing the output frame in memory. In some examples, the process 800 includes displaying the output frame.

In some examples, the process 800 includes generating, by a first convolutional layer of an encoder sub-network of the neural network system, output values associated with a luminance channel of a frame (e.g., associated with Y channel input 602); generating, by a second convolutional layer of the encoder sub-network, output values associated with at least one chrominance channel of the frame (e.g., associated with reconstructed UV channel inputs 604); generating a combined representation of the frame by combining the output values associated with the luminance channel of the frame and the output values associated with the at least one chrominance channel of the frame; and generating the encoded frame based on the combined representation of the frame (e.g., as binary data 636 which is then obtained as an encoded frame in block 802).

In some examples, the encoded frame includes an encoded video frame. In some examples, the at least one chrominance channel includes a chrominance-blue channel and a chrominance-red channel. In some examples, the encoded frame has a luminance-chrominance (YUV) format.

Figure 9:
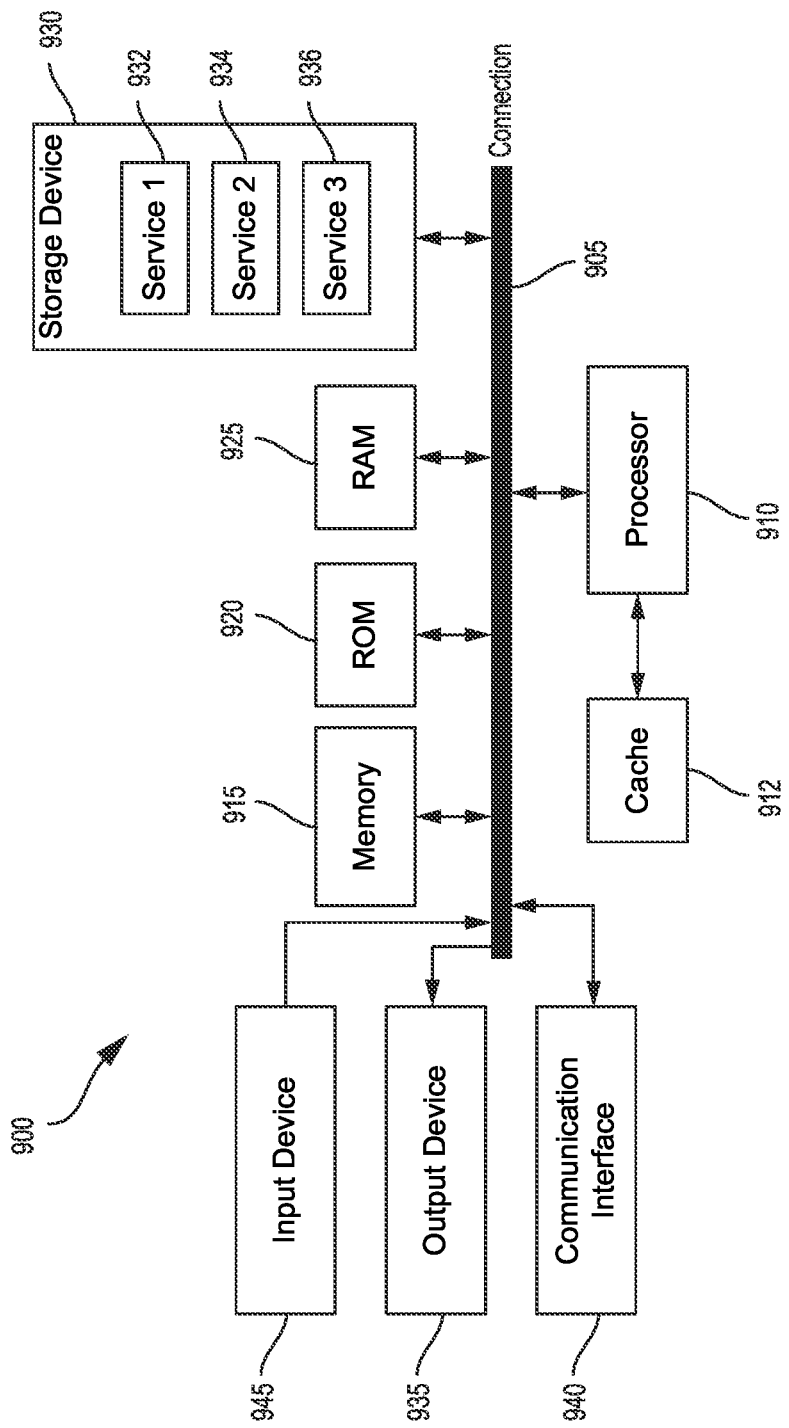
FIG. 9 illustrates an example computing device architecture of an example computing device which can implement the various techniques described herein.

In some examples, the processes described herein (e.g., process 700, process 800, and/or other process described herein) may be performed by a computing device or apparatus, such as a computing device having the computing device architecture 900 shown in FIG. 9. In one example, the process 700 and/or the process 800 can be performed by a computing device with the computing device architecture 900 implementing the neural network architecture shown in FIG. 6. In some examples, the computing device can include a mobile device (e.g., a mobile phone, a tablet computing device, etc.), a wearable device, an extended reality device (e.g., a virtual reality (VR) device, an augmented reality (AR) device, or a mixed reality (MR) device), a personal computer, a laptop computer, a video server, a television, a vehicle (or a computing device of a vehicle), robotic device, and/or any other computing device with the resource capabilities to perform the processes described herein, including process 700 and/or process 800.

In some cases, the computing device or apparatus may include various components, such as one or more input devices, one or more output devices, one or more processors, one or more microprocessors, one or more microcomputers, one or more transmitters, receivers or combined transmitter-receivers (e.g., referred to as transceivers), one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), neural processing units (NPUs), and/or other suitable electronic circuits), and/or can include and/or be implemented using computer software, firmware, or any combination thereof, to perform the various operations described herein.

The processes 700 and 800 are illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein (including process 700, process 800, and/or other processes described herein) may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 9 illustrates an example computing device architecture 900 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. For example, the computing device architecture 900 can implement the system of FIG. 6. The components of computing device architecture 900 are shown in electrical communication with each other using connection 905, such as a bus. The example computing device architecture 900 includes a processing unit (CPU or processor) 910 and computing device connection 905 that couples various computing device components including computing device memory 915, such as read only memory (ROM) 920 and random access memory (RAM) 925, to processor 910.

Computing device architecture 900 can include a cache of high-speed memory connected directly with, in close proximity to, or integrated as part of processor 910. Computing device architecture 900 can copy data from memory 915 and/or the storage device 930 to cache 912 for quick access by processor 910. The cache can provide a performance boost that avoids processor 910 delays while waiting for data. These and other modules can control or be configured to control processor 910 to perform various actions. Other computing device memory 915 may be available for use as well. Memory 915 can include multiple different types of memory with different performance characteristics. Processor 910 can include any general purpose processor and a hardware or software service, such as service 1 932, service 2 934, and service 3 936 stored in storage device 930, configured to control processor 910 as well as a special-purpose processor where software instructions are incorporated into the processor design. Processor 910 may be a self-contained system, containing multiple cores or processors, a bus, memory controller, cache, etc. A multi-core processor may be symmetric or asymmetric.

To enable user interaction with the computing device architecture 900, input device 945 can represent any number of input mechanisms, such as a microphone for speech, a touch-sensitive screen for gesture or graphical input, keyboard, mouse, motion input, speech and so forth. Output device 935 can also be one or more of a number of output mechanisms known to those of skill in the art, such as a display, projector, television, speaker device, etc. In some instances, multimodal computing devices can enable a user to provide multiple types of input to communicate with computing device architecture 900. Communication interface 940 can generally govern and manage the user input and computing device output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof. Storage device 930 can include services 932, 934, 936 for controlling processor 910. Other hardware or software modules are contemplated. Storage device 930 can be coupled to the computing device connection 905. In one aspect, a hardware module that performs a particular function can include the software component stored in a computer-readable medium in connection with the necessary hardware components, such as processor 910, connection 905, output device 935, and so forth, to carry out the function.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors, and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific embodiments. For example, a system may be implemented on one or more printed circuit boards or other substrates, and may have movable or static components. While the below description and examples use the term "system" to describe various aspects of this disclosure, the term "system" is not limited to a specific configuration, type, or number of objects.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the present disclosure include:

Aspect 1: A method of processing video data, the method comprising: generating, by a first convolutional layer of an encoder sub-network of a neural network system, output values associated with a luminance channel of a frame; generating, by a second convolutional layer of the encoder sub-network, output values associated with at least one chrominance channel of the frame; generating a combined representation of the frame by combining the output values associated with the luminance channel of the frame and the output values associated with the at least one chrominance channel of the frame; and generating encoded video data based on the combined representation of the frame.

Aspect 2: The method of aspect 1, further comprising: processing, using a first normalization layer of the encoder sub-network, the output values associated with a luminance channel of the frame; and processing, using a second normalization layer of the encoder sub-network, the output values associated with at least one chrominance channel of the frame; wherein the combined representation is generated based on an output of the first normalization layer and an output of the second normalization layer.

Aspect 3: The method of any one of aspects 1 or 2, further comprising: quantizing the encoded video data.

Aspect 4: The method of any one of aspects 1 to 3, further comprising: entropy coding the encoded video data.

Aspect 5: The method of any one of aspects 1 to 4, further comprising: storing the encoded video data in memory.

Aspect 6: The method of any one of aspects 1 to 5, further comprising: transmitting the encoded video data over a transmission medium to at least one device.

Aspect 7: The method of any one of aspects 1 to 6, further comprising: obtaining an encoded frame; generating, by a first convolutional layer of a decoder sub-network of the neural network system, reconstructed output values associated with a luminance channel of the encoded frame; and generating, by a second convolutional layer of the decoder sub-network, reconstructed output values associated with at least one chrominance channel of the encoded frame.

Aspect 8: The method of any one of aspects 1 to 7, wherein the frame includes a video frame.

Aspect 9: The method of any one of aspects 1 to 8, wherein the at least one chrominance channel includes a chrominance-blue channel and a chrominance-red channel.

Aspect 10: The method of any one of aspects 1 to 9, wherein the frame has a luminance-chrominance (YUV) format.

Aspect 11: The method of any one of aspects 1 to 10, wherein the at least one chrominance channel and the luminance channel have different statistical characteristics, and wherein the first normalization layer and the second normalization layer are configured to balance statistical characteristics of the output values associated with the at least one chrominance channel and the output values associated with the luminance channel.

Aspect 12: The method of any one of aspects 1 to 11, wherein the first convolutional layer of the encoder sub-network subsamples the luminance channel of the frame.

Aspect 13: The method of aspect 12, wherein a luminance filter of the first convolutional layer has a luminance filter size larger than a chrominance filter size of a chrominance filter of the second convolutional layer.

Aspect 14: The method of any one of aspects 1 to 13, further comprising: accessing input luminance values associated with the luminance channel of the frame, wherein the input luminance values are further associated with a luminance resolution; and accessing input chrominance values associated with the at least one chrominance channel of the frame, wherein the input chrominance values are further associated with a chrominance resolution, and wherein the luminance resolution is larger than the chrominance resolution.

Aspect 15: The method of aspect 14, wherein a luminance filter of the first convolutional layer has a luminance filter size five pixels by five pixels, and wherein a chrominance filter of the second convolutional layer has a chrominance filter size of three pixels by three pixels.

Aspect 16: An apparatus for processing video data, comprising: a memory; and one or more processors coupled to the memory and configured to: generate, using a first convolutional layer of an encoder sub-network of a neural network system, output values associated with a luminance channel of a frame; generate, using a second convolutional layer of the encoder sub-network, output values associated with at least one chrominance channel of the frame; generate a combined representation of the frame by combining the output values associated with the luminance channel of the frame and the output values associated with the at least one chrominance channel of the frame; and generate encoded video data based on the combined representation of the frame.

Aspect 17: The apparatus of aspect 16, wherein the one or more processors are configured to: process, using a first normalization layer of the encoder sub-network, the output values associated with a luminance channel of the frame; and process, using a second normalization layer of the encoder sub-network, the output values associated with at least one chrominance channel of the frame; wherein the combined representation is generated based on an output of the first normalization layer and an output of the second normalization layer.

Aspect 18: The apparatus of any one of aspects 16 or 17, wherein the one or more processors are configured to: quantize the encoded video data.

Aspect 19: The apparatus of any one of aspects 16 to 18, wherein the one or more processors are configured to: entropy code the encoded video data.

Aspect 20: The apparatus of any one of aspects 16 to 19, wherein the one or more processors are configured to: store the encoded video data in memory.

Aspect 21: The apparatus of any one of aspects 16 to 20, wherein the one or more processors are configured to: transmit the encoded video data over a transmission medium to at least one device.

Aspect 22: The apparatus of any one of aspects 16 to 21, wherein the one or more processors are configured to: obtain an encoded frame; generate, using a first convolutional layer of a decoder sub-network of the neural network system, reconstructed output values associated with a luminance channel of the encoded frame; and generate, using a second convolutional layer of the decoder sub-network, reconstructed output values associated with at least one chrominance channel of the encoded frame.

Aspect 23: The apparatus of any one of aspects 16 to 22, wherein the frame includes a video frame.

Aspect 24: The apparatus of any one of aspects 16 to 23, wherein the at least one chrominance channel includes a chrominance-blue channel and a chrominance-red channel.

Aspect 25: The apparatus of any one of aspects 16 to 24, wherein the frame has a luminance-chrominance (YUV) format.

Aspect 26: The apparatus of any one of aspects 16 to 25, wherein the one or more processors include a neural processing unit (NPU).

Aspect 27: The apparatus of any one of aspects 16 to 26, wherein the apparatus comprises a mobile device.

Aspect 28: The apparatus of any one of aspects 16 to 27, wherein the apparatus comprises an extended reality device.

Aspect 29: The apparatus of any one of aspects 16 to 28, further comprising a display.

Aspect 30: The apparatus of any one of aspects 16 to 29, wherein the apparatus comprises television.

Aspect 31: The apparatus of any one of aspects 16 to 30, wherein the apparatus comprises camera configured to capture one or more video frames.

Aspect 32: The apparatus of any one of aspects 16 to 31, wherein the at least one chrominance channel and the luminance channel have different statistical characteristics, and wherein the first normalization layer and the second normalization layer are configured to balance statistical characteristics of the output values associated with the at least one chrominance channel and the output values associated with the luminance channel.

Aspect 33: The apparatus of any one of aspects 16 to 32, wherein the first convolutional layer of the encoder sub-network subsamples the luminance channel of the frame.

Aspect 34: The apparatus of aspect 33, wherein a luminance filter of the first convolutional layer has a luminance filter size larger than a chrominance filter size of a chrominance filter of the second convolutional layer.

Aspect 35: The apparatus of any one of aspects 16 to 34, wherein the one or more processors are configured to: access input luminance values associated with the luminance channel of the frame, wherein the input luminance values are further associated with a luminance resolution; and access input chrominance values associated with the at least one chrominance channel of the frame, wherein the input chrominance values are further associated with a chrominance resolution, and wherein the luminance resolution is larger than the chrominance resolution.

Aspect 36: The apparatus of aspect 35, wherein a luminance filter of the first convolutional layer has a luminance filter size five pixels by five pixels, and wherein a chrominance filter of the second convolutional layer has a chrominance filter size of three pixels by three pixels.

Aspect 37: The apparatus of any one of aspects 16 to 36, wherein the apparatus comprises a mobile device.

Aspect 38: The apparatus of any one of aspects 16 to 37, further comprising a display coupled to the processor.

Aspect 39: A computer-readable storage medium storing instructions that, when executed, cause one or more processors to perform any of the operations of aspects 1 to 38.

Aspect 40: An apparatus comprising means for performing any of the operations of aspects 1 to 38.

Aspect 41: A method of processing video data, the method comprising: obtaining an encoded frame; generating, by a first convolutional layer of a decoder sub-network of a neural network system, reconstructed output values associated with a luminance channel of the encoded frame; generating, by a second convolutional layer of the decoder sub-network, reconstructed output values associated with at least one chrominance channel of the encoded frame; and generating an output frame including the reconstructed output values associated with the luminance channel and the reconstructed output values associated with the at least one chrominance channel.

Aspect 42: The method of aspect 41, further comprising: processing, using a first normalization layer of the decoder sub-network, values associated with the luminance channel of the encoded frame, wherein the reconstructed output values associated with the luminance channel are generated based on an output of the first normalization layer; and processing, using a second normalization layer of the decoder sub-network, values associated with the at least one chrominance channel of the encoded frame, wherein the reconstructed output values associated with the at least one chrominance channel are generated based on an output of the second normalization layer.

Aspect 43: The method of any one of aspects 41 or 42, wherein the first convolutional layer of the decoder sub-network upsamples the luminance channel of the encoded frame.

Aspect 44: The method of any of aspects 41 to 43, wherein a luminance filter of the first convolutional layer has a luminance filter size larger than a chrominance filter size of a chrominance filter of the second convolutional layer of the decoder sub-network.

Aspect 45: The method of aspect 44, wherein the luminance filter size is nine pixels by nine pixels, and wherein the chrominance filter size is five pixels by five pixels.

Aspect 46: The method of any of aspects 41 to 45, further comprising entropy decoding samples of the encoded frame.

Aspect 47: The method of any of aspects 41 to 46, further comprising: generating, using a first convolutional layer of an encoder sub-network of the neural network system, output values associated with the luminance channel of a frame; generating, using a second convolutional layer of the encoder sub-network, output values associated with the at least one chrominance channel of the frame; generating a combined representation of the frame by combining the output values associated with the luminance channel of the frame and the output values associated with the at least one chrominance channel of the frame; and generating the encoded frame based on the combined representation of the frame.

Aspect 48: The method of any of aspects 41 to 47, wherein the neural network system is part of a neural processing unit (NPU).

Aspect 49: The method of any one of aspects 41 or 48, further comprising: dequantizing samples of the encoded frame.

Aspect 50: The method of any one of aspects 41 to 49, further comprising: storing the output frame in memory.

Aspect 51: The method of any one of aspects 41 to 50, further comprising: displaying the output frame.

Aspect 52: The method of any one of aspects 41 to 51, wherein the encoded frame includes an encoded video frame.

Aspect 53: The method of any one of aspects 41 to 52, wherein the at least one chrominance channel includes a chrominance-blue channel and a chrominance-red channel.

Aspect 54: The method of any one of aspects 41 to 53, wherein the encoded frame has a luminance-chrominance (YUV) format.

Aspect 55: An apparatus for processing video data, comprising: a memory; and one or more processors coupled to the memory and configured to: obtain an encoded frame; generate, using a first convolutional layer of a decoder sub-network of a neural network system, reconstructed output values associated with a luminance channel of the encoded frame; generate, using a second convolutional layer of the decoder sub-network, reconstructed output values associated with at least one chrominance channel of the encoded frame; and generate an output frame including the reconstructed output values associated with the luminance channel and the reconstructed output values associated with the at least one chrominance channel.

Aspect 56: The apparatus of aspect 55, wherein the one or more processors are configured to: process, using a first normalization layer of the decoder sub-network, values associated with the luminance channel of the encoded frame, wherein the reconstructed output values associated with the luminance channel are generated based on an output of the first normalization layer; and process, using a second normalization layer of the decoder sub-network, values associated with the at least one chrominance channel of the encoded frame, wherein the reconstructed output values associated with the at least one chrominance channel are generated based on an output of the second normalization layer.

Aspect 57: The apparatus of any one of aspects 55 or 56, wherein the first convolutional layer of the decoder sub-network upsamples the luminance channel of the encoded frame.

Aspect 58: The apparatus of any of aspects 55 to 57, wherein a luminance filter of the first convolutional layer has a luminance filter size larger than a chrominance filter size of a chrominance filter of the second convolutional layer of the decoder sub-network.

Aspect 59: The apparatus of aspect 58, wherein the luminance filter size is nine pixels by nine pixels, and wherein the chrominance filter size is five pixels by five pixels.

Aspect 60: The apparatus of any of aspects 55 to 59, wherein the one or more processors are configured to entropy decode samples of the encoded frame.

Aspect 61: The apparatus of any of aspects 55 to 60, wherein the one or more processors are configured to: generate, using a first convolutional layer of an encoder sub-network of the neural network system, output values associated with the luminance channel of a frame; generate, using a second convolutional layer of the encoder sub-network, output values associated with the at least one chrominance channel of the frame; generate a combined representation of the frame by combining the output values associated with the luminance channel of the frame and the output values associated with the at least one chrominance channel of the frame; and generate the encoded frame based on the combined representation of the frame.

Aspect 62: The apparatus of any of aspects 55 to 61, wherein the neural network system is part of a neural processing unit (NPU).

Aspect 63: The apparatus of any one of aspects 55 or 62, wherein the one or more processors are configured to dequantize samples of the encoded frame.

Aspect 64: The apparatus of any one of aspects 55 to 63, wherein the one or more processors are configured to cause the output frame to be stored in the memory.

Aspect 65: The apparatus of any one of aspects 55 to 64, wherein the one or more processors are configured to cause the output frame to be displayed.

Aspect 66: The apparatus of any one of aspects 55 to 65, wherein the encoded frame includes an encoded video frame.

Aspect 67: The apparatus of any one of aspects 55 to 66, wherein the at least one chrominance channel includes a chrominance-blue channel and a chrominance-red channel.

Aspect 68: The apparatus of any one of aspects 55 to 67, wherein the encoded frame has a luminance-chrominance (YUV) format.

Aspect 69: The apparatus of any one of aspects 55 to 68, further comprising a display coupled to the processor, wherein the output frame comprises a video frame output to the display of the apparatus.

Aspect 70: A computer-readable storage medium storing instructions that, when executed, cause one or more processors to perform any of the operations of aspects 41 to 69.

Aspect 71: An apparatus comprising means for performing any of the operations of aspects 41 to 69.

Aspect 72: A method of performing any of the operations of aspects 1 to 38 and any of the operations of aspects 41 to 69.

Aspect 73: An apparatus for processing video data, comprising: a memory; and one or more processors coupled to the memory and configured to perform any of the operations of aspects 1 to 38 and any of the operations of aspects 41 to 69.

Aspect 74: A computer-readable storage medium storing instructions that, when executed, cause one or more processors to perform any of the operations of aspects 1 to 38 and any of the operations of aspects 41 to 69.

Aspect 75: An apparatus comprising means for performing any of the operations of aspects 1 to 38 and any of the operations of aspects 41 to 69.

What is claimed is:

1. An apparatus for processing video data, comprising:
a memory; and
a processor coupled to the memory and configured to:
generate, using a first convolutional layer of an encoder sub-network of a neural network system, output values associated with a luminance channel of a frame, wherein the first convolutional layer of the encoder sub-network is configured to subsample the luminance channel of the frame to a resolution matching a resolution of at least one chrominance channel of the frame;
generate, using a second convolutional layer of the encoder sub-network, output values associated with the at least one chrominance channel of the frame;
generate a combined representation of the frame by combining the output values associated with the luminance channel of the frame and the output values associated with the at least one chrominance channel of the frame; and
generate encoded video data based on the combined representation of the frame.

2. The apparatus of claim 1, wherein the processor is configured to:
process, using a first normalization layer of the encoder sub-network, the output values associated with the luminance channel of the frame; and
process, using a second normalization layer of the encoder sub-network, the output values associated with the at least one chrominance channel of the frame;
wherein the combined representation is generated based on an output of the first normalization layer and an output of the second normalization layer.

3. The apparatus of claim 2, wherein the at least one chrominance channel and the luminance channel have different statistical characteristics, and wherein the first normalization layer and the second normalization layer are configured to balance statistical characteristics of the output values associated with the at least one chrominance channel and the output values associated with the luminance channel.

4. The apparatus of claim 1, wherein a luminance filter of the first convolutional layer has a luminance filter size larger than a chrominance filter size of a chrominance filter of the second convolutional layer.

5. The apparatus of claim 1, wherein the processor is further configured to:
generate the output values associated with the luminance channel of the frame based on input luminance values associated with the luminance channel of the frame, wherein the input luminance values are further associated with a luminance resolution; and
generate the output values associated with the at least one chrominance channel of the frame based on input chrominance values associated with the at least one chrominance channel of the frame, wherein the input chrominance values are further associated with a chrominance resolution, and wherein the luminance resolution is larger than the chrominance resolution.

6. The apparatus of claim 1, wherein a luminance filter of the first convolutional layer has a luminance filter size five pixels by five pixels, and wherein a chrominance filter of the second convolutional layer has a chrominance filter size of three pixels by three pixels.

7. The apparatus of claim 1, wherein the apparatus comprises a mobile device.

8. The apparatus of claim 1, further comprising a display coupled to the processor.

9. A method of processing video data, the method comprising:
generating, by a first convolutional layer of an encoder sub-network of a neural network system, output values associated with a luminance channel of a frame, wherein the first convolutional layer of the encoder sub-network is configured to subsample the luminance channel of the frame to a resolution matching a resolution of at least one chrominance channel of the frame;
generating, by a second convolutional layer of the encoder sub-network, output values associated with the at least one chrominance channel of the frame;
generating a combined representation of the frame by combining the output values associated with the luminance channel of the frame and the output values associated with the at least one chrominance channel of the frame; and
generating encoded video data based on the combined representation of the frame.

10. The method of claim 9, further comprising:
processing, using a first normalization layer of the encoder sub-network, the output values associated with the luminance channel of the frame; and
processing, using a second normalization layer of the encoder sub-network, the output values associated with at the at least one chrominance channel of the frame;
wherein the combined representation is generated based on an output of the first normalization layer and an output of the second normalization layer.

11. The method of claim 10, further comprising:
obtaining an encoded frame generated from the at least one chrominance channel and the luminance channel;
generating, by a first convolutional layer of a decoder sub-network of the neural network system, reconstructed output values associated with a luminance channel of the encoded frame; and
generating, by a second convolutional layer of the decoder sub-network, reconstructed output values associated with at least one chrominance channel of the encoded frame.

12. The method of claim 10, wherein the frame has a luminance-chrominance (YUV) format.

13. The method of claim 10, wherein the at least one chrominance channel and the luminance channel have different statistical characteristics, and wherein the first normalization layer and the second normalization layer are configured to balance statistical characteristics of the output values associated with the at least one chrominance channel and the output values associated with the luminance channel.

14. The method of claim 9, wherein a luminance filter of the first convolutional layer has a luminance filter size larger than a chrominance filter size of a chrominance filter of the second convolutional layer.

15. The method of claim 9, further comprising:
generating the output values associated with the luminance channel of the frame based on input luminance values associated with the luminance channel of the frame, wherein the input luminance values are further associated with a luminance resolution; and
generating the output values associated with the at least one chrominance channel of the frame based on input chrominance values associated with the at least one chrominance channel of the frame, wherein the input chrominance values are further associated with a chrominance resolution, and wherein the luminance resolution is larger than the chrominance resolution.

16. An apparatus for processing video data, comprising:
a memory; and
a processor coupled to the memory and configured to:
obtain an encoded frame;
generate, using a first convolutional layer of a decoder sub-network of a neural network system, reconstructed output values associated with a luminance channel of the encoded frame, wherein the first convolutional layer of the decoder sub-network is configured to upsample the luminance channel to a resolution matching a resolution of at least one chrominance channel of the encoded frame;
generate, using a second convolutional layer of the decoder sub-network, reconstructed output values associated with the at least one chrominance channel of the encoded frame; and
generate an output frame including the reconstructed output values associated with the luminance channel and the reconstructed output values associated with the at least one chrominance channel.

17. The apparatus of claim 16, wherein the processor is configured to:
process, using a first normalization layer of the decoder sub-network, values associated with the luminance channel of the encoded frame, wherein the reconstructed output values associated with the luminance channel are generated based on an output of the first normalization layer; and
process, using a second normalization layer of the decoder sub-network, values associated with the at least one chrominance channel of the encoded frame, wherein the reconstructed output values associated with the at least one chrominance channel are generated based on an output of the second normalization layer.

18. The apparatus of claim 16, wherein a luminance filter of the first convolutional layer has a luminance filter size larger than a chrominance filter size of a chrominance filter of the second convolutional layer.

19. The apparatus of claim 18, wherein the luminance filter size is nine pixels by nine pixels, and wherein the chrominance filter size is five pixels by five pixels.

20. The apparatus of claim 16, wherein the processor is configured to:
entropy decode samples of the encoded frame.

21. The apparatus of claim 16, wherein the processor is configured to:
generate, using a first convolutional layer of an encoder sub-network of the neural network system, output values associated with the luminance channel of a frame;
generate, using a second convolutional layer of the encoder sub-network, output values associated with the at least one chrominance channel of the frame;
generate a combined representation of the frame by combining the output values associated with the luminance channel of the frame and the output values associated with the at least one chrominance channel of the frame; and
generate the encoded frame based on the combined representation of the frame.

22. The apparatus of claim 16, wherein the processor includes a neural processing unit (NPU).

23. The apparatus of claim 16, further comprising a display coupled to the processor, wherein the output frame comprises a video frame output to the display of the apparatus.

24. A method of processing video data, the method comprising:
obtaining an encoded frame;
generating, by a first convolutional layer of a decoder sub-network of a neural network system, reconstructed output values associated with a luminance channel of the encoded frame, wherein the first convolutional layer of the decoder sub-network is configured to upsample the luminance channel to a resolution matching a resolution of at least one chrominance channel of the encoded frame;
generating, by a second convolutional layer of the decoder sub-network, reconstructed output values associated with the at least one chrominance channel of the encoded frame; and
generating an output frame including the reconstructed output values associated with the luminance channel and the reconstructed output values associated with the at least one chrominance channel.

25. The method of claim 24, further comprising:
processing, using a first normalization layer of the decoder sub-network, values associated with the luminance channel of the encoded frame, wherein the reconstructed output values associated with the luminance channel are generated based on an output of the first normalization layer; and
processing, using a second normalization layer of the decoder sub-network, values associated with the at least one chrominance channel of the encoded frame, wherein the reconstructed output values associated with the at least one chrominance channel are generated based on an output of the second normalization layer.

26. The method of claim 24, wherein a luminance filter of the first convolutional layer has a luminance filter size larger than a chrominance filter size of a chrominance filter of the second convolutional layer of the decoder sub-network.

27. The method of claim 26, wherein the luminance filter size is nine pixels by nine pixels, and wherein the chrominance filter size is five pixels by five pixels.

28. The method of claim 24, further comprising entropy decoding samples of the encoded frame.

29. The method of claim 24, further comprising:
generating, using a first convolutional layer of an encoder sub-network of the neural network system, output values associated with the luminance channel of a frame;
generating, using a second convolutional layer of the encoder sub-network, output values associated with the at least one chrominance channel of the frame;
generating a combined representation of the frame by combining the output values associated with the luminance channel of the frame and the output values associated with the at least one chrominance channel of the frame; and
generating the encoded frame based on the combined representation of the frame.

30. The method of claim 23, wherein the neural network system is part of a neural processing unit (NPU).

* * * * *